US012183063B2

(12) United States Patent
Wen et al.

(10) Patent No.: US 12,183,063 B2
(45) Date of Patent: Dec. 31, 2024

(54) MULTI-RESOLUTION IMAGE PATCHES FOR PREDICTING AUTONOMOUS NAVIGATION PATHS

(71) Applicant: NVIDIA Corporation, Santa Clara, CA (US)

(72) Inventors: Haiguang Wen, Edison, NJ (US); Bernhard Firner, Highland Park, NJ (US); Mariusz Bojarski, Lincroft, NJ (US); Zongyi Yang, Eatontown, NJ (US); Urs Muller, Keyport, NJ (US)

(73) Assignee: NVIDIA Corporation, Santa Clara, CA (US)

( * ) Notice: Subject to any disclaimer, the term of this patent is extended or adjusted under 35 U.S.C. 154(b) by 732 days.

(21) Appl. No.: 16/917,289

(22) Filed: Jun. 30, 2020

(65) Prior Publication Data

US 2021/0406679 A1   Dec. 30, 2021

(51) Int. Cl.
*G06K 9/00* (2022.01)
*G06N 3/08* (2023.01)
(Continued)

(52) U.S. Cl.
CPC ............... *G06V 10/82* (2022.01); *G06N 3/08* (2013.01); *G06T 7/70* (2017.01); *G06T 9/002* (2013.01); *G06V 10/25* (2022.01); *G06V 10/50* (2022.01); *G06V 10/52* (2022.01); *G06V 20/56* (2022.01); *G06T 2207/20081* (2013.01)

(58) Field of Classification Search
CPC ............ G06N 3/08; G06N 3/02; G06N 20/10; G06V 10/25; G06V 10/50; G06V 10/82; G06V 20/56
See application file for complete search history.

(56) References Cited

U.S. PATENT DOCUMENTS 9,311,735 B1 * 4/2016 Amirghodsi .............. G06T 5/77
10,885,698 B2   1/2021 Muthler et al.
(Continued)

OTHER PUBLICATIONS

Aghdam, Hamed Habibi, Elnaz Jahani Heravi, and Domenec Puig. "A practical approach for detection and classification of traffic signs using convolutional neural networks." Robotics and autonomous systems 84 (2016): 97-112.*

(Continued)

*Primary Examiner* — Gregory A Morse
*Assistant Examiner* — Owais Iqbal Memon
(74) *Attorney, Agent, or Firm* — Taylor English Duma L.L.P.

(57) ABSTRACT

In examples, image data representative of an image of a field of view of at least one sensor may be received. Source areas may be defined that correspond to a region of the image. Areas and/or dimensions of at least some of the source areas may decrease along at least one direction relative to a perspective of the at least one sensor. A downsampled version of the region (e.g., a downsampled image or feature map of a neural network) may be generated from the source areas based at least in part on mapping the source areas to cells of the downsampled version of the region. Resolutions of the region that are captured by the cells may correspond to the areas of the source areas, such that certain portions of the region (e.g., portions at a far distance from the sensor) retain higher resolution than others.

20 Claims, 13 Drawing Sheets

(51) Int. Cl.
*G06T 7/70* (2017.01)
*G06T 9/00* (2006.01)
*G06V 10/25* (2022.01)
*G06V 10/50* (2022.01)
*G06V 10/52* (2022.01)
*G06V 10/82* (2022.01)
*G06V 20/56* (2022.01)

(56) References Cited

U.S. PATENT DOCUMENTS

| | | | |
|---|---|---|---|
| 11,182,598 B2 | 11/2021 | Sriram et al. | |
| 2012/0327189 A1* | 12/2012 | Muramatsu | G06T 7/593 |
| | | | 348/46 |
| 2017/0200063 A1* | 7/2017 | Nariyambut Murali | |
| | | | G06V 10/454 |
| 2019/0122378 A1* | 4/2019 | Aswin | G06T 7/20 |
| 2019/0303759 A1 | 10/2019 | Farabet et al. | |
| 2019/0356850 A1* | 11/2019 | Ashrafi | H04N 23/667 |
| 2020/0160559 A1* | 5/2020 | Urtasun | G06V 20/58 |
| 2020/0257306 A1* | 8/2020 | Nisenzon | G06V 20/56 |

OTHER PUBLICATIONS

Aghdam, Hamed Habibi, Elnaz Jahani Heravi, and Domenec Puig. "A practical approach for detection and classification of traffic signs using convolutional neural networks." Robotics and autonomous systems 84 (2016): 97-112. (Year: 2016).*

"Taxonomy and Definitions for Terms Related to Driving Automation Systems for On-Road Motor Vehicles", National Highway Traffic Safety Administration (NHTSA), A Division of the US Department of Transportation, and the Society of Automotive Engineers (SAE), Standard No. J3016-201609, pp. 1-30 (Sep. 30, 2016).

"Taxonomy and Definitions for Terms Related to Driving Automation Systems for On-Road Motor Vehicles", National Highway Traffic Safety Administration (NHTSA), A Division of the US Department of Transportation, and the Society of Automotive Engineers (SAE), Standard No. J3016-201806, pp. 1-35 (Jun. 15, 2018).

IEC 61508, "Functional Safety of Electrical/Electronic/Programmable Electronic Safety-related Systems (E/E/PE, or E/E/Pes)," Retrieved from Internet URL: https://en.wikipedia.org/wiki/IEC_61508, accessed on Apr. 1, 2022, 7 pages.

ISO 26262, "Road vehicle—Functional safety," International Standard for Functional Safety of Electronic System, Retrieved from Internet URL: https://en.wikipedia.org/wiki/ISO_26262, accessed on Sep. 13, 2021, 8 pages.

* cited by examiner

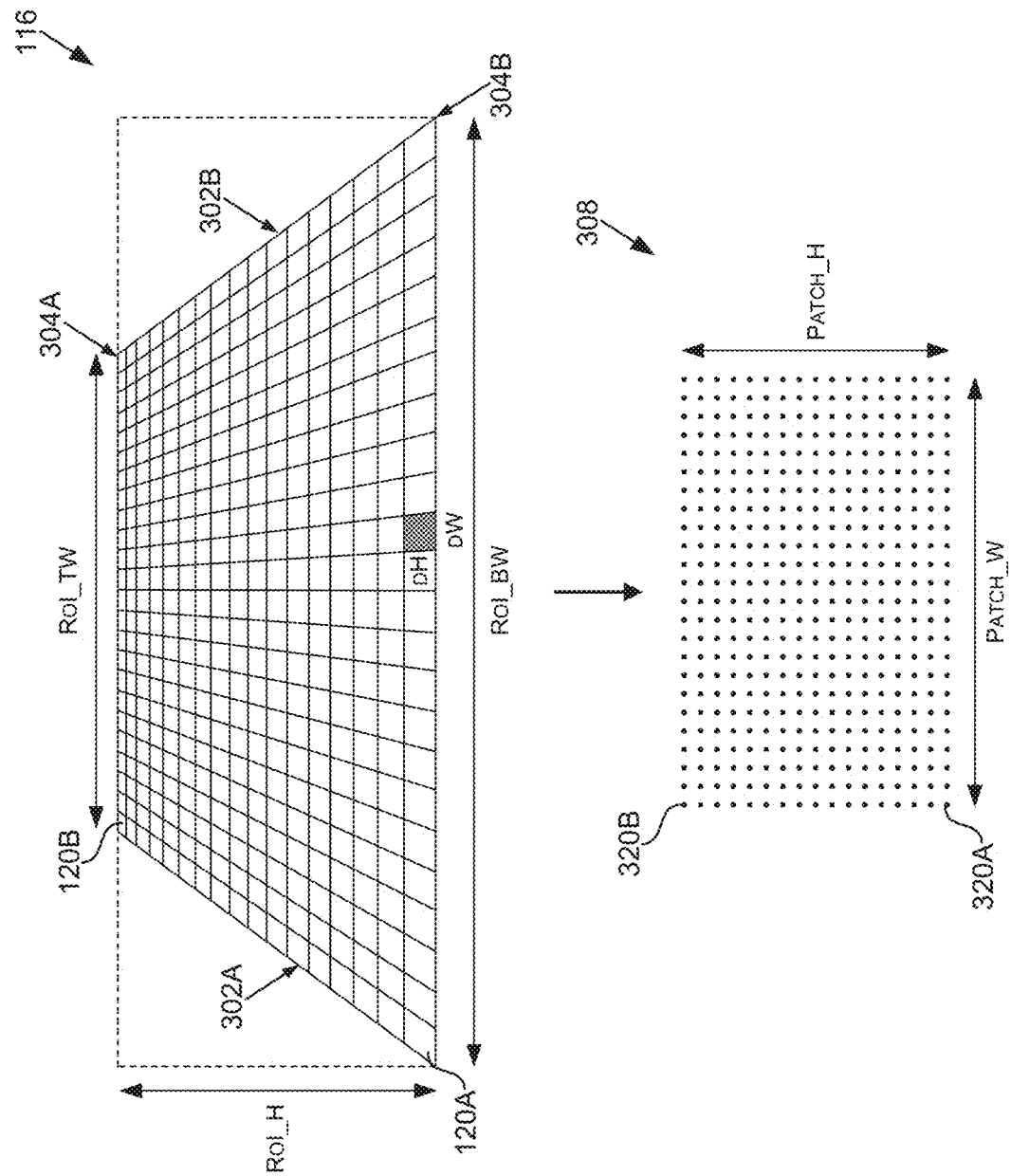

MULTI-RESOLUTION IMAGE PATCHES FOR PREDICTING AUTONOMOUS NAVIGATION PATHS

BACKGROUND

Designing a system to drive a vehicle autonomously without supervision at a level of safety required for practical acceptance is tremendously difficult. An autonomous vehicle should at least be capable of performing as a functional equivalent of an attentive driver, who draws upon a perception and action system that has an incredible ability to identify and react to moving and static obstacles in a complex environment in order to avoid colliding with other objects or structures along its path. An autonomous system may be tasked with determining a recommended path for the autonomous vehicle to follow through complex environments the vehicle may encounter. For path planning or control, conventional systems use a trained Deep Neural Network (DNN) that outputs data used by one or more components of an autonomous vehicle to navigate an environment. For example, image data may be used by the DNN to compute outputs used to control steering angles, acceleration, and/or deceleration for the vehicle.

Predicting an accurate driving path may require high-resolution data that provides enough information for a DNN to perceive an environment clearly at a distance. To account for this, in some conventional systems the image data used by the DNN may represent a high-resolution image captured by a camera of the vehicle. However, a high computational load is imposed on these systems due to the DNN processing a high-resolution image. In other conventional systems, the image data used by the DNN may represent a low-resolution version of the image captured by the camera and/or a Region of Interest (RoI) cropped from the image. While the computational load may be reduced for these systems, the image resolution captured by the image data may be insufficient for a DNN to extract needed road features at a far distance. As such, the safety of the autonomous vehicle may be impaired.

SUMMARY

Embodiments of the disclosure relate to multi-resolution image patches for predicting autonomous navigation paths. In particular, the disclosure provides, in part, approaches for generating, from an image, a multi-resolution image patch in which portions of the image are captured at different resolutions. For example, the resolutions captured from the portions of the image may increase along one or more directions so that a DNN may more clearly perceive the environment at a distance, while still sufficiently perceiving the environment up close. Using disclosed approaches may allow a DNN to accurately predict long-range driving paths using lower-resolution data than conventional approaches.

In some respects, source areas of a region of an image captured by a camera may be defined such that areas of at least some of the source areas decrease along at least one direction relative to a perspective of the camera. For example, the source areas may form a grid (e.g., a grid of source area cells) that represents the region, and the grid may be shaped as a trapezoid with the areas decreasing along opposing sides of the trapezoid. A downsampled version of the region may be generated based at least on mapping subsets of the source areas (comprising one or more source areas) to grid cells of the downsampled version, where resolutions of the region that are captured by the cells correspond to the areas of the source areas. The downsampled version may be applied to at least a portion of one or more machine learning models (MLMs), such as one or more Neural Network, to control operation of an autonomous vehicle and/or other machine.

In at least some embodiments, a downsampling algorithm may be used to generate image data representative of the downsampled version from the region of the image. Additionally or alternatively, the region may be downsampled, at least in part, by one or more convolutional layers of an MLM(s), for example, based at least on controlling dilation factors of one or more convolutional kernels. In further respects, the source areas may be consistent across images processed by the MLM(s), or may be varied based at least on one or more characteristics of the vehicle and/or other machine that is controlled using output from the MLM(s).

BRIEF DESCRIPTION OF THE DRAWINGS

The present systems and methods for multi-resolution image patches for predicting autonomous navigation paths is described in detail below with reference to the attached drawing figures, wherein:

FIG. 3 is a diagram used to explain an example of how a multi-resolution image of a region may be generated using a downsampling algorithm, in accordance with some embodiments of the present disclosure;

DETAILED DESCRIPTION

Figure 1:
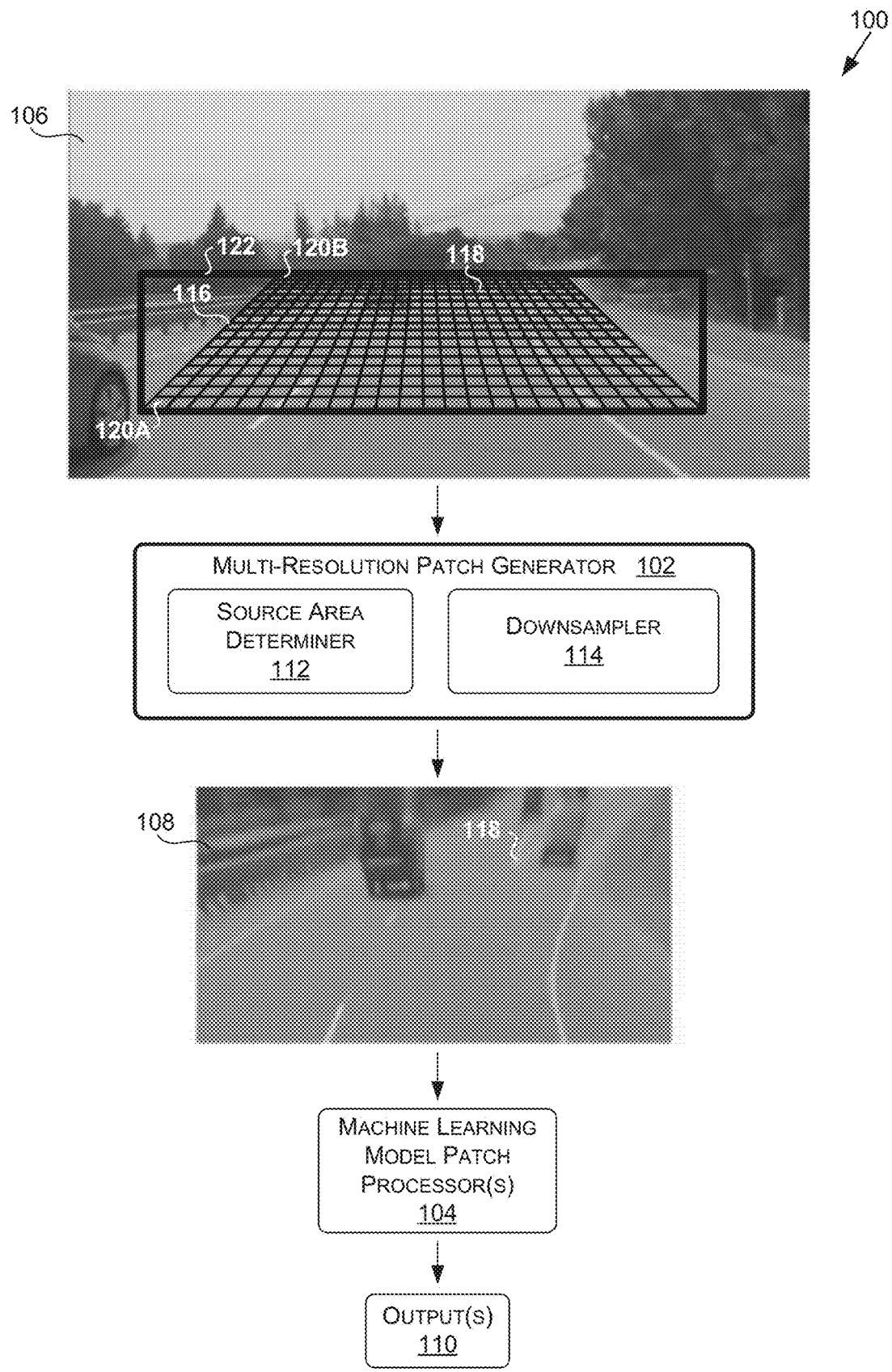
FIG. 1 is a data flow diagram illustrating an example of a process for a multi-resolution perception system, in accordance with some embodiments of the present disclosure.

The present disclosure relates to multi-resolution image patches for predicting autonomous navigation paths. In particular, the disclosure provides, in part, approaches for generating, from an image, a multi-resolution image patch in which portions of the image are captured at different resolutions. For example, the resolutions for the portions of the image that are captured may increase along one or more directions so that a DNN may more clearly perceive the environment at a distance, while still sufficiently perceiving the environment up close. Using disclosed approaches may allow a DNN to accurately predict long-range driving paths using lower-resolution images than conventional approaches.

Disclosed embodiments may be implemented in a variety of different perception-based systems such as in automotive systems, robotics, aerial systems, boating systems, smart area monitoring, simulation, and/or other technology areas. Disclosed approaches may be used for any perception-based control, analysis, monitoring, tracking and/or behavior modification of machine and/or systems.

For locomotive systems, although the present disclosure may be described with respect to an example autonomous vehicle 900 (alternatively referred to herein as "vehicle 900" or "ego-vehicle 900," an example of which is described herein with respect to FIGS. 9A-9D), this is not intended to be limiting. For example, the systems and methods described herein may be used by non-autonomous vehicles, semi-autonomous vehicles (e.g., in one or more advanced driver assistance systems (ADAS)), robots, warehouse vehicles, off-road vehicles, flying vessels, boats, and/or other vehicle types. In addition, although the present disclosure may be described with respect to path planning or control (e.g., for autonomous driving), this is not intended to be limiting. For example, the systems and methods described herein may be used for any perception-based control and/or behavior modification in automotive systems, robotics, aerial systems, boating systems, and/or other technology areas.

For simulation, various disclosed embodiments may be incorporated into systems and/or methods described in U.S. Non-Provisional application Ser. No. 16/366,875, filed on Mar. 27, 2019, and titled "Training, Testing, and Verifying Autonomous Machines Using Simulated Environments," which is hereby incorporated by reference in its entirety.

For smart area monitoring, various disclosed embodiments may be incorporated into systems and/or methods described in U.S. Non-Provisional application Ser. No. 16/365,581, filed on Mar. 26, 2019, and titled "Smart Area Monitoring with Artificial Intelligence," which is hereby incorporated by reference in its entirety.

In some respects, source areas of a region of an image captured by a camera may be defined such that areas of at least some of the source areas decrease along at least one direction relative to a perspective of the camera. For example, the source areas may form a grid that represents the region and the grid may be shaped as a trapezoid with the areas decreasing along opposing sides of the trapezoid. A downsampled version of the region may be generated based at least on mapping subsets of the source areas (comprising one or more source areas) to cells of the downsampled version of the region, where resolutions of the region that are captured by the cells correspond to the areas of the source areas. The downsampled version may be applied to at least a portion of one or more machine learning models (MLMs), such as one or more DNNs, to control operation of an autonomous vehicle and/or other machine.

In at least some embodiments, each cell of the downsampled version of the region may represent a pixel and a downsampling algorithm may be used to map the subsets of the source areas to the pixels and compute pixel values of the pixels based on the mappings. Any suitable downsampling algorithm may be employed, such as nearest neighbor, bilinear interpolation, or cubic convolution. Image data representing the downsampled version of the region may be applied as input to the MLM(s), which may have been trained using other downsampled images that were generated using the downsampling algorithm. Using this approach, the MLM(s) may learn the relationships between portions of the downsampled images and the environment while accounting for the variable resolutions captured by the pixels.

Additionally or alternatively, in at least some embodiments, the region may be downsampled, at least in part, by one or more convolutional layers of the MLM(s). For example, the source areas may be defined based at least on adjusting dilation factors of one or more kernels of one or more convolutional layers of the MLM(s). As examples, the dilation factors may be adjusted vertically and/or horizontally to define the source areas. In embodiments, the image may be input to the MLM(s), for example, to a DNN, and each cell of the downsampled version of the region may represent one or more elements of a feature map of output of a convolutional layer of the DNN. Subsequent layers of the DNN may process the feature map to generate one or more outputs of the DNN. The DNN may have been trained by similarly downsampling other images to learn the relationships between portions of the downsampled versions and the environment while accounting for the variable resolutions captured by the pixels.

In some examples, the source areas may be defined based at least on one or more characteristics of the vehicle and/or other machine that is controlled using output from the MLM(s). For example, the MLM(s) may be trained to learn the relationship between values of the one or more characteristics and the source areas, so that the source areas may be defined differently across frames while still being interpretable by the MLM(s). The one or more characteristics may be based at least on, for example, vehicle speed, vehicle orientation, vehicle steering angle, vehicle proximity to one or more other objects, driving location (e.g., highway vs. surface street), etc. For example, the source areas may be adjusted so that resolutions captured by the downsampled versions of regions are shifted higher for image portions nearer to the vehicle based on increased vehicle speed and/or transitioning onto the highway. As a further example, the source areas may be curved based on vehicle steering angle and/or vehicle orientation to follow road curvature. These and other variations are contemplated as being within the scope of the present disclosure.

With reference to FIG. 1, FIG. 1 is a data flow diagram illustrating an example of a process 100 for a multi-resolution perception system, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. By way of example, multi-resolution perception systems in accordance with the disclosure may be implemented on one or more instances of the computing device 1000 of FIG. 10.

A multi-resolution perception system may include, among other things, a multi-resolution patch generator 102 and a Machine Learning Model (MLM) patch processor(s) 104. The multi-resolution patch generator 102 may be configured to receive images (e.g., an image 106) and may generate multi-resolution patches from the images (e.g., a multi-resolution patch 108 generated from the image 106). The MLM patch processor(s) 104 may process the multi-resolution patches to generate output(s) 110, which may be used for various purposes, such as to control operation of an autonomous vehicle and/or other machine.

The multi-resolution patch generator 102 may employ a source area determiner 112 and a downsampler 114 to generate the multi-resolution patches from the image data. The source area determiner 112 may be configured to define and/or determine source areas of regions of images (e.g., source areas 120A and 120B of a region 116). The downsampler 114 may be configured to downsample the regions based at least on the source areas defined and/or determined by the source area determiner 112. As such, a multi-resolution patch 108 may be referred to as a downsampled version of a region 116 of the image 106.

In various embodiments, the multi-resolution patch generator 102 may receive image data representative of the image 106 of a field(s) of view of at least one sensor, such as one or more of the cameras of the vehicle 900 described herein with respect to FIGS. 9A-9D. In some examples, the image data may be preprocessed using such techniques as rectification, which may include compensating for lens distortion, lens location, and lens orientation.

In the example of FIG. 1, the region 116 may comprise a Region of Interest (RoI) of the image 106. The source area determiner 112 may use an RoI to define an area of an image 106 that is analyzed by the MLM patch processor(s) 104 to make predictions regarding one or more tasks. The RoI may be used to discard other areas of the image 106 that may not be needed or desired for the analysis, and/or so that the other areas may be separately or distinctly analyzed. For example, for the purpose of determining a trajectory or path for the vehicle 900, the region 116 may be defined (e.g., for each image processed by the MLM patch processor(s) 104) so as to discard most or all of the sky and area outside of the road being navigated. The source area determiner 112 may use any suitable approach to determine the size and/or location of the region 116 (e.g., RoI based-approaches). For example, in some embodiments, the region 116 may be defined at a same location within each image 106 and/or be of a same size and/or shape for each image 106.

A conventional system may define a rectangular RoI 122 from an image 106. The RoI 122 may be cropped from the image 106 and uniformly downsampled to generate a lower resolution version of the RoI 122. In the downsampled version of the RoI 122, details near the camera (at the bottom of the downsampled version of the RoI 122)—such as nearby vehicles and road marking—may be large so that an MLM may accurately extract features for those details. However, details farther from the camera (at the top of the downsampled version of the RoI 122)—such as more distant vehicles and road markings—may be small so that the MLM may have difficulty accurately interpreting those details. This may compromise the predictions made by the MLM, and as such, the safety of an autonomous vehicle may be impaired. For example, in FIG. 1, an MLM may have difficulty interpreting road markings 118 as an off-ramp. This may result in the MLM predicting a path that swerves right before the off-ramp while navigating the highway.

In accordance with disclosed approaches, the source area determiner 112 may define the region 116 and source areas thereof such that the region 116 is non-uniformly downsampled in generating a multi-resolution patch 108. In particular, resolutions of the region 116 that are captured by cells (e.g., of pixels or feature maps) of the multi-resolution patch 108 may correspond to the areas of the source areas (e.g., pixels of a source area may be mapped to a cell when downsampling). Herein, cells (e.g., of one or more pixels or features) of the multi-resolution patch 108 or an intermediate or predecessor thereof may also be referred to as target cells. Smaller source areas of the region 116 (e.g., the source area 120B), may correspond to higher captured resolutions of the region 116 than larger source areas of the region 116 (e.g., the source area 120A). In various embodiments, each cell of the target cells of the multi-resolution patch 108 may have an equivalent or substantially equivalent resolution (e.g., each target cell may be a single pixel) such that the resolutions of the region 116 that are captured by the target cells relative to one another are primarily or completely controlled by the source area sizes and/or dimensions when downsampling.

Using disclosed approaches, the MLM patch processor(s) 104 may be able to extract needed features at a far distance from the multi-resolution patch 108. For example, the road markings 118 may be captured in the multi-resolution patches 108 with sufficient detail that the MLM patch processor(s) may predict a path that is temporally stable without swerving before the off-ramp while navigating the highway.

Generally, the source area determiner 112 may define a region 116 as a subset of an image 106 that is downsampled by the downsampler 114 to generate a multi-resolution patch 108. For example, data representing the region 116 may be downsampled by the downsampler 114, resulting in the multi-resolution patch 108. While the region 116 is shown as being within a margin of each side of the image 106, in other examples, the region 116 may expand to one or more sides of the image 106 without a margin on that side. Various approaches may be used to define and/or determine the source areas of a region. In some examples, the multi-resolution patch generator 102 may define the region 116 and/or each source area from each image using a mask or template. For example, the multi-resolution patch generator 102 may use the same template to define the region 116 and/or the source areas for each image from a camera that is processed by the multi-resolution perception system or different templates may be used, such as to vary sizes and/or shapes of the region 116 and/or source areas. In other examples, the region 116 and/or source areas may be defined and/or determined algorithmically and/or using one or more mathematical formulas. For example, the multi-resolution patch generator 102 may compute one or more dimensions (e.g., boundaries and/or locations) of each source area to define the source areas of a region 116.

Figure 2A:
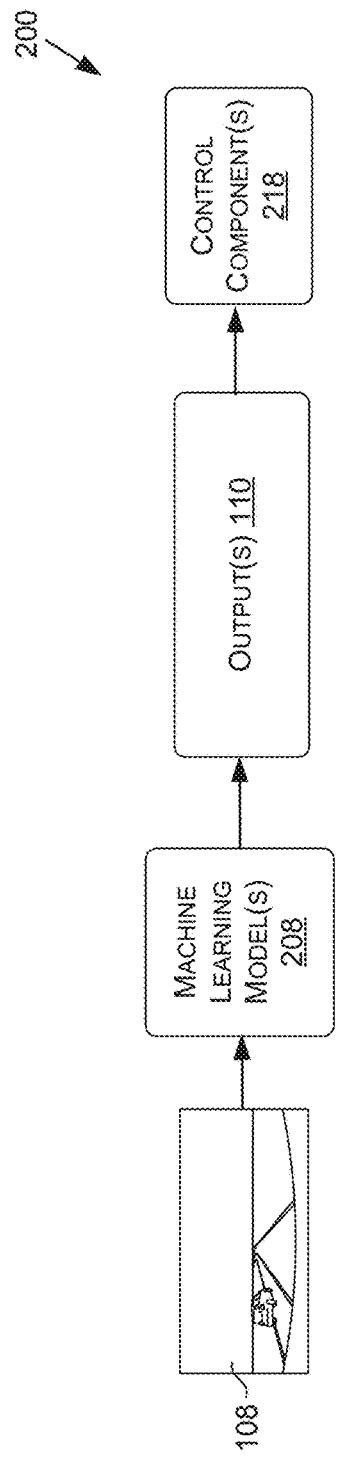
FIG. 2A is a data flow diagram illustrating an example of a process for multi-resolution perception using multi-resolution images as input to at least one machine learning model of a multi-resolution perception system, in accordance with some embodiments of the present disclosure.

As described herein, in at least some embodiments, the multi-resolution patch generator 102 may apply a downsampling algorithm to the region 116 to generate image data representing the multi-resolution patch 108. In such examples, the multi-resolution patch 108 may be provided as image data to an input of one or more MLMs comprising the MLM patch processor(s) 104. For example, FIG. 2A is a data flow diagram illustrating an example of a process 200 for multi-resolution perception using multi-resolution images (e.g., the multi-resolution patch 108) as input to at least one MLM 208 of a multi-resolution perception system, in accordance with some embodiments of the present disclosure. In the example of FIG. 2A, the multi-resolution patch generator 102 may be separate from the MLM(s) 208 and the MLM patch processor(s) 104 may be embodied at least partially in the MLM(s) 208.

Figure 2B:
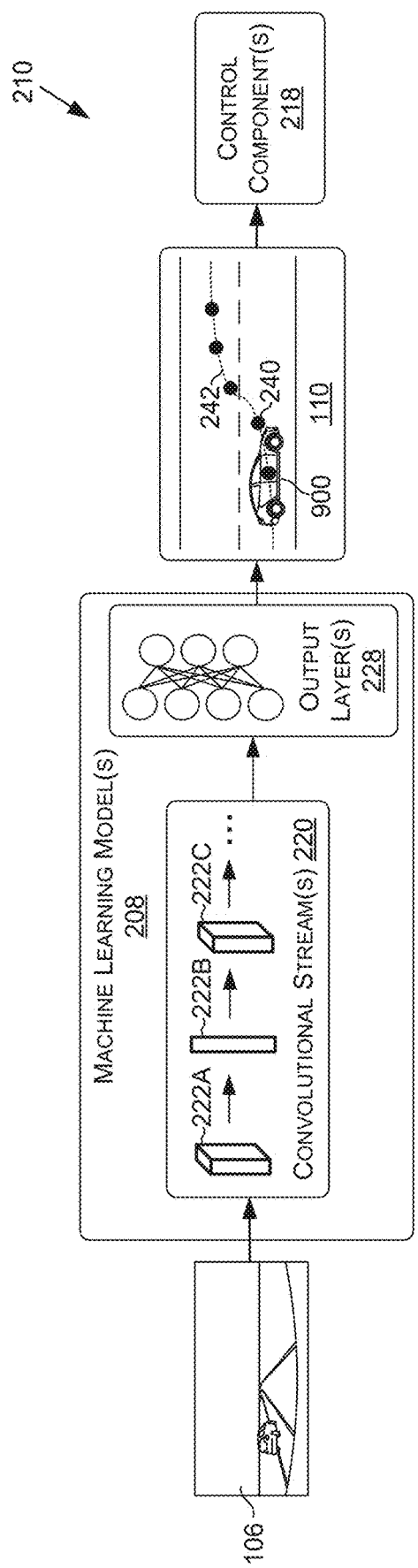
FIG. 2B is a data flow diagram illustrating an example of a process for multi-resolution perception using multi-resolution feature maps generated using at least one neural network of a multi-resolution perception system, in accordance with some embodiments of the present disclosure.

Also described herein, in at least some embodiments, the multi-resolution patch generator 102 may downsample the region 116 using one or more convolutional layers of a neural network(s) to generate feature map data representing the multi-resolution patch 108. In such examples, the image 106 (or a portion thereof) may be provided as image data to an input of a NN(s), and the NN(s) may generate the multi-resolution patch 108. The MLM patch processor(s) 104 may receive output of the one or more convolutional layers to generate the output(s) 110. For example, FIG. 2B is a data flow diagram illustrating an example of a process 210 for multi-resolution perception using multi-resolution feature maps generated using at least one neural network (e.g., of the MLM(s) 208) of a multi-resolution perception system, in accordance with some embodiments of the present disclosure. In the example of FIG. 2B, the multi-resolution patch generator 102 may be embodied at least partially in the MLM(s) 208 and the MLM patch processor(s) 104 may also be embodied at least partially in the MLM(s) 208.

Figure 5:
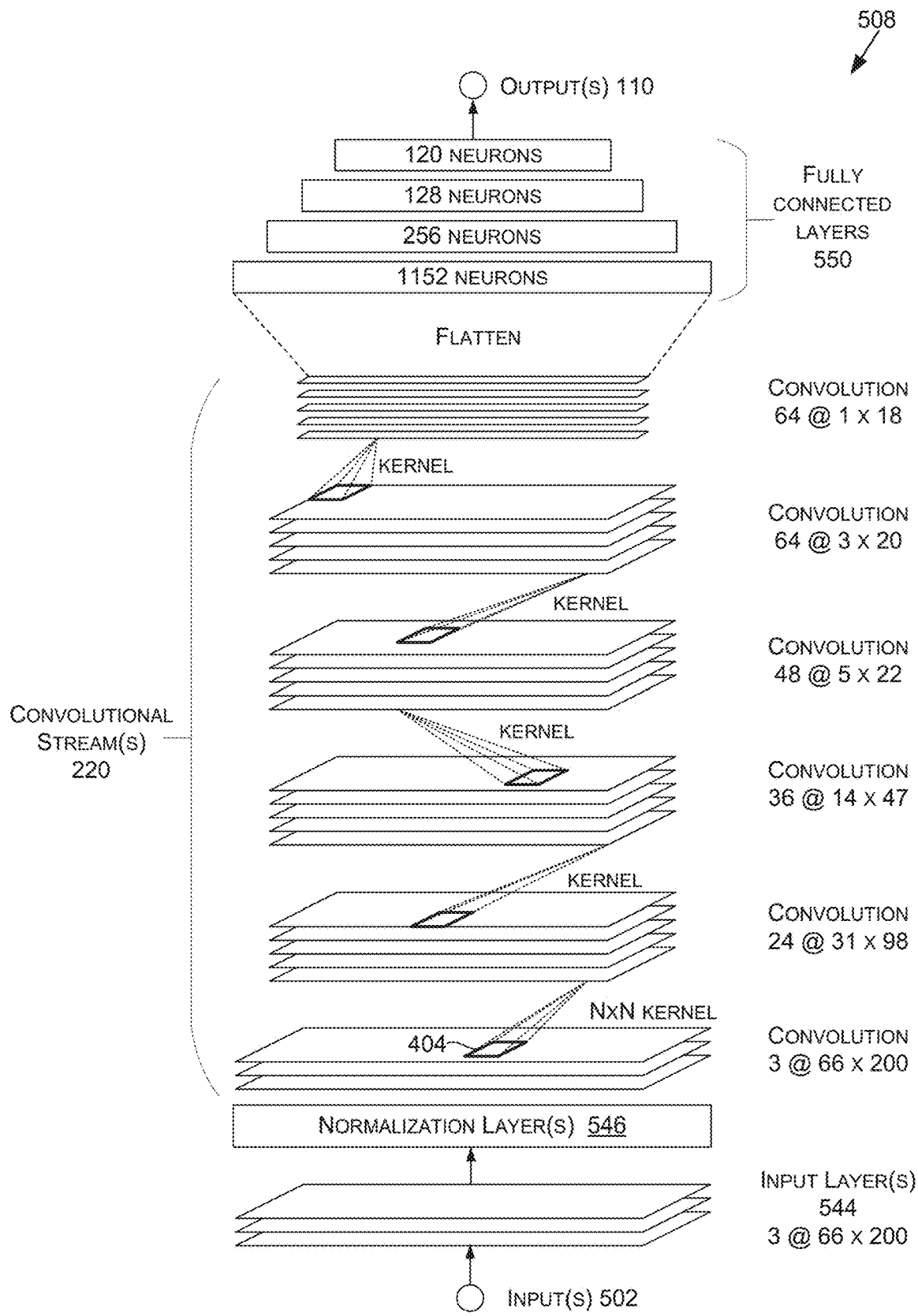
FIG. 5 is a diagram illustrating an example of a neural network, in accordance with some embodiments of the present disclosure.

The machine learning model(s) 208 may use as input sensor data representative of one or more images and/or other data representations or instances (e.g., LIDAR data, RADAR data, SONAR data, ultrasound data, etc.) to generate the output(s) 110. In a non-limiting example, the MLM(s) 208 may take as input an image(s) represented by the sensor data (e.g., after pre-processing). FIG. 2B is used to describe examples where the MLM(s) 208 comprise one or more neural networks, and specifically convolutional neural networks, as the MLM(s) 208. FIG. 5 is further used to describe examples of suitable neural networks for the MLM(s) 208. However, this is not intended to be limiting. For example, and without limitation, the machine learning model(s) 208 described herein may include any type or combination of machine learning models, such as a machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Hopfield, Boltzmann, deep belief, deconvolutional, generative adversarial, liquid state machine, etc.), and/or other types of machine learning models.

As shown in FIG. 2B, the MLM(s) 208 may include, amongst other features not specifically shown, one or more convolutional streams 220 and one or more output layers 228. Although described with respect to the image 106 and FIG. 2B, the description may apply to the multi-resolution patch 108 and FIG. 2A.

The image 106 may be input into a convolutional layer(s) 222 of the MLM(s) 208 (e.g., convolutional layer 222A). The convolutional stream 220 may include any number of layers 222, such as the layers 222A-222C. In some examples, image 106 and/or sensor data from each different camera and/or each different sensor, respectively, may be associated with its own convolutional stream (e.g., image 106 from a first camera may have a first convolutional stream, image 106 from a second camera may have a second convolutional stream, sensor data from a first sensor has a third convolutional stream, and so on). In some examples, some sensor data and/or image 106 may not be associated with any convolutional layers. In such examples, one or more other layer types may be used for at least some of the image 106 without departing from the scope of the present disclosure.

One or more of the layers 222 may include an input layer. The input layer(s) may hold values associated with the image 106. For example, with respect to the image 106, the input layer(s) may hold values representative of the raw pixel values of the image(s) as a volume (e.g., a width, W, a height, H, and color channels, C (e.g., RGB), such as 32×32×3), and/or a batch size, B.

One or more layers 222 may include convolutional layers. The convolutional layers may compute the output of neurons that are connected to local regions in an input layer (e.g., the input layer), each neuron computing a dot product between their weights and a small region they are connected to in the input volume. A result of a convolutional layer may be another volume, with one of the dimensions based on the number of filters applied (e.g., the width, the height, and the number of filters, such as 32×32×12, if 12 were the number of filters).

One or more of the layers 222 may include a rectified linear unit (ReLU) layer. The ReLU layer(s) may apply an elementwise activation function, such as the max (0, x), thresholding at zero, for example. The resulting volume of a ReLU layer may be the same as the volume of the input of the ReLU layer. Although ReLU layers are described, any suitable activation function may be employed in various embodiments.

One or more of the layers 222 may include a pooling layer. The pooling layer may perform a down-sampling operation along the spatial dimensions (e.g., the height and the width), which may result in a smaller volume than the input of the pooling layer (e.g., 16×16×12 from the 32×32×12 input volume). In some examples, the MLM(s) 208 may not include any pooling layers. In such examples, strided convolutional layers may be used.

One or more of the layers 222 may include a fully connected layer. Each neuron in the fully connected layer(s) may be connected to each of the neurons in the previous volume. The fully connected layer may compute class scores, and the resulting volume may be 1×1×number of classes. In some examples, the convolutional stream(s) 220 may include a fully connected layer, while in other examples, the fully connected layer of the MLM(s) 208 may be the fully connected layer separate from the convolutional streams(s) 220 (e.g., the fully connected layer(s) may be part of the output layer(s) 228, as illustrated in FIG. 5.

Although input layers, convolutional layers, pooling layers, ReLU layers, and fully connected layers are discussed herein with respect to the convolutional stream(s) 220, this is not intended to be limiting. For example, additional or alternative layers may be used in the convolutional stream(s) 220, such as normalization layers, SoftMax layers, and/or other layer types.

Different orders and numbers of the layers of the MLM(s) 208 may be used depending on the embodiment. In other words, the order and number of layers of the MLM(s) 208, the convolutional streams 220, and/or the output layer(s) 228 is not limited to any one architecture.

In addition, some of the layers of the MLM(s) 208 may include parameters (e.g., weights and/or biases), such as the layers of the convolutional streams 220 and/or the output layer(s) 228, while others may not, such as the ReLU layers and pooling layers, for example. In some examples, the parameters may be learned by the convolutional streams 220 and/or the MLM(s) 208 during training. Further, some of the layers 222 may include additional hyper-parameters (e.g., learning rate, stride, epochs, kernel size, number of filters, type of pooling for pooling layers, etc.), such as the convolutional layer(s) 222A, the output layer(s) 228, and the pooling layers (as part of the convolutional stream(s) 220), while other layers may not, such as the ReLU layers. Various activation functions may be used, including but not limited to, ReLU, leaky ReLU, sigmoid, hyperbolic tangent (tanh), exponential linear unit (ELU), etc. The parameters, hyper-parameters, and/or activation functions are not to be limited and may differ depending on the embodiment. The output of the convolutional stream(s) 220 may be input to output layer(s) 228 (which may be fully connected layer(s), in some examples) of the MLM(s) 208.

The output(s) 110 of the MLM(s) 208 described herein may include trajectory data, vehicle orientation data, vehicle state data, and/or other output types. FIG. 2B shows an example where the output(s) 110 includes trajectory data, but this is not intended to be so limiting. In some embodiments, the trajectory data may be representative of a recommended trajectory 242. However, in some examples, the output(s) 110 may include control data for following the recommended trajectory 242 (e.g., for controlling the vehicle 900 according to the recommended trajectory 242, such as steering angle, acceleration, deceleration, etc.). The trajectory data may represent, in some examples, a trajectory point(s) 240 (e.g., as represented by 2D or 3D coordinates in world space, and/or 2D coordinates in image space) along the recommended trajectory 242. In some examples, only a single trajectory point 240 (e.g., the next trajectory point for the vehicle 900 in the sequence of discretized trajectory steps) may be output by the MLM(s) 208. In other examples, more than one trajectory point 240 may be output. As another example, an entire trajectory may be output, which may be extrapolated from two or more trajectory points 240. In some examples, the recommended trajectory 242 may be output as a radius of the recommended trajectory 242, or may be output as an inverse radius of the recommended trajectory 242 (e.g., where a turn, a lane change, a lane split, a lane marge, and/or a curve is included in the recommended trajectory 242). The recommended trajectory 242 and/or the trajectory point(s) 240 thereon, may be used by the control component(s) 218 to control the vehicle 900 through a physical environment.

In some examples, the output(s) 110 of the MLM(s) 208 may comprise data corresponding to detected objects, such as classification data (e.g., class confidence maps, segmentations masks, etc.) and/or various types of information about the detected objects, such as location, geometry, and/or orientation. The output(s) 110 may be processed to generate 2D and/or 3D bounding boxes and class labels for one or more of the detected objects. In various examples, the techniques described herein may be used to detect and classify animate objects and/or parts of an environment, and these detections and classifications may be provided to an autonomous vehicle's or machine's navigation and/or control stack to enable safe planning and control of the autonomous vehicle or machine. In various embodiments, the MLM(s) 208 may perform (e.g., using LiDAR data) top-down or "Bird's Eye View" (BEV) object detection (e.g. of signs, cars, obstacles, or lane graphs that may be represented in "Bird's Eye View").

In various embodiments, the control component(s) 218 may correspond to any control component or module of a machine, such as for implementing control and/or behavior modification of the machine. In the example of the vehicle 900, the control component(s) 218 may include controller(s) 936, ADAS system 938, SOC(s) 904, and/or other components of the autonomous vehicle 900 (e.g., used to aid the vehicle in navigating an environment, such as for path planning).

In at least one embodiment, the source area determiner 112 may define the source areas and/or dimensions of a region 116 such that areas and/or dimensions of at least some of the source areas decrease along at least one direction relative to a boundary of the region. Source areas decreasing along a direction may result in a corresponding increase in resolution that is captured by the multi-resolution patch 108 along that direction. In various examples, the source area determiner 112 may define the source areas and/or dimensions of a region 116 such that areas and/or dimensions of at least some of the source areas correspond to and/or are based at least on a proximity of any particular source area cell to one or more boundaries of the region.

In at least one embodiment, the areas and/or dimensions of the source areas may decrease along least one direction relative to a perspective of at least one sensor used to capture the image 106 (e.g., a camera of the vehicle 900). Depicted examples are for images captured by a pinhole camera. However, the region 116 may vary greatly for different types of cameras and/or camera-lens combinations. As an example, for cameras having a fisheye lens, the region 116 may comprise a circular or elliptical region of a circle or ring, or portion thereof. In some examples, dimensions and/or areas of source areas may decrease radially outward from a center of the region 116. Using different types of cameras and/or lenses may be in tandem with modifications to equations described herein, so as to account for different intrinsic parameters (e.g., so that captured resolutions generally increase based on distance from the camera and/or vehicle in one or more directions).

Referring now to FIG. 3, FIG. 3 is a diagram used to explain an example of how a multi-resolution image 308 of the region 116 may be generated using a downsampling algorithm, in accordance with some embodiments of the present disclosure. The multi-resolution image 308 may correspond to the multi-resolution patch 108 depicted in FIG. 1.

In the example shown in FIG. 3, the source areas of the region 116 form a grid that defines the region 116 and the grid is shaped as a trapezoid. The source areas in FIG. 3 are decreasing in size (e.g., area, and along at least one dimension) along opposing sides 302A and 302B (or borders) of the trapezoid and along opposing sides 304A and 304B (or borders) of the trapezoid (in a direction from the side 304B to the side 304A). This may result in the horizontal resolutions and the vertical resolutions (pixels per degree) captured by the multi-resolution image 308 similarly increasing along the vertical and horizontal directions.

For example, the multi-resolution image 308 may be generated based at least on mapping subsets of the source areas (comprising one or more source areas) to pixels of the multi-resolution image 308, where resolutions of the region 116 that are captured by the pixels correspond to the areas of the source areas. For a smaller source area, the downsampler 114 may aggregate fewer pixels into a cell (e.g., of one or more pixels) of the multi-resolution image 308, thereby capturing a higher resolution of the region 116 compared to a larger source area, where more pixels may be aggregated into a cell. As an example, a downsampling algorithm employed by the downsampler 114 may aggregate one or more pixels of the source area 120B to compute a value(s) of a pixel 320B of the multi-resolution image 308 and may aggregate one or more pixels of the source area 120A to compute a value(s) of a pixel 320A of the multi-resolution image 308.

To downsample the region 116, the downsampler 114 may map each pixel in the multi-resolution image 308 to a source area in the region 116. In some embodiments, the downsampler 114 may compute a pixel value as an average value of the source area. However, any suitable downsampling algorithm may be employed, such as nearest neighbor, bilinear interpolation, or cubic convolution. In various examples, the downsampler 114 may map source areas of the grid or matrix formed by the source areas to cells of a matrix formed by the multi-resolution image 308. In particular, while in the example shown each cell of the multi-resolution image 308 corresponds to a pixel, in other examples a cell may include multiple pixels (e.g., a fixed-size number of pixels).

Using a nearest neighbor algorithm, for every cell (e.g., pixel) in the multi-resolution image 308, the downsampler 114 may map the cell to the nearest source area (e.g., a center thereof) of the region 116, and average or otherwise aggregate corresponding values in that source area to compute a value(s) of the cell. For bilinear interpolation, for every cell in the multi-resolution image 308, the downsampler 114 may map a cell to the nearest four neighbor source areas (e.g., with regard to centers thereof) of the region 116, and average or otherwise aggregate corresponding values to compute a value(s) of the cell. In one or more embodiments, a weighted average may be applied such that values of the source areas nearest to the source area are weighted more heavily. According to one or more embodiments, cubic convolution may be applied in a manner similar to bilinear interpolation, but may use the nearest 16 source areas. In any example, a weighted average may be performed so that pixels and/or source areas of greater proximity are weighted more heavily when computing a value(s) for a cell of the multi-resolution image 308. In some respects, any downsampling algorithm may be used which maps one or more source areas to cells of the multi-resolution image 308, including those which typically operate on square source areas, or modified versions thereof. These and other downsampling algorithms are contemplated as being within the scope of the disclosure.

In the example of FIG. 3, the horizontal and vertical resolutions (pixels per degree) of the region 116 captured by the multi-resolution image 308 may increase (e.g., linearly) from near to far distance. However, the rate of change may be different in other embodiments and may increase in some spans along a direction while decreasing along others. Changes in the rate and/or direction of the increase may be defined in order to control the level of detail captured in the multi-resolution image 308, and may not in all embodiments be tailored to enhance detail based on distance in the environment. For example, in some embodiments source areas may be larger towards the center of the region 116 and one or more dimensions or areas thereof may decrease in a direction(s) toward a side(s) (e.g., radially, horizontally and/or vertically, etc.). Additionally, while the region 116 is a trapezoid, the region 116 may take the form of other shapes and may or may not have discrete sides. Although the source areas of the embodiment shown include straight boundaries, in various examples, one or more source areas may have one or more curved boundaries. Also, boundaries between source areas may not be contiguous in various embodiments.

An example of how the source area determiner 112 of the multi-resolution patch generator 102 may define the source areas of the region 116 is provided, but other approaches may be used. In the example of FIG. 3, the region 116 has a top width RoI_TW, a bottom width RoI_BW, and a height RoI_H there between. The multi-resolution image 308 has a width Patch_W and a height Patch_H (e.g., in cells and/or pixels). For the multi-resolution image 308, in pixel space, the width and height of the region 116 may be linearly increasing from top to bottom. The source area determiner 112 may use a horizontal resolution ratio ratio_W and a vertical resolution ratio ratio_H to define the source areas thereof. The horizontal/vertical resolution ratio may be defined as the width/height ratio of a bottom source area 120A to a top source area 120B.

Given the bottom width RoI_BW, the height RoI_H, the width Patch_W, the height Patch_H, the horizontal resolution ratio ratio_W, and the vertical resolution ratio ratio_H, the source area determiner 112 may impose the following constraints when computing dimensions and/or areas of the source areas:

$$dW(\text{RoI\_}H-1) = \text{RoI\_}BW/\text{Patch\_}W \quad \text{Equation (1)}$$

$$\text{ratio\_}W = dW(\text{Patch\_}H-1)/dW(0) \quad \text{Equation (2)}$$

$$\text{ratio\_}H = dH(\text{Patch\_}H-1)/dH(0) \quad \text{Equation (3)}$$

$$\sum_{i=0}^{\text{Patch\_}H-1} dH(i) = \text{RoI\_}H \quad \text{Equation (4)}$$

where i represents a row index starting a 0 for the top most row of source areas, dW represents a source area width, and dH represents a source area height.

The source area determiner 112 may then compute source area widths and heights for each source region according to the following:

$$dW(i) = a_w * i + b_w; \text{ for } i=0,1,\ldots,\text{Patch\_}H-1 \quad \text{Equation (5)}$$

$$dH(i) = a_h * i + b_h; \text{ for } i=0,1,\ldots,\text{Patch\_}H-1 \quad \text{Equation (6)}$$

where $a_w$, $a_h$, $b_w$, and $b_h$ are based on the constraints of Equations (1)-(4). If the source area determiner 112 were to set ratio_W=1 and ratio_H=1, the above equations may result in a uniform resolution of a region 116 being captured by a multi-resolution image 308.

Various approaches may be used to determine the bottom width RoI_BW, the height RoI_H, the width Patch_W, the height Patch_H, the horizontal resolution ratio ratio_W, and the vertical resolution ratio ratio_H for a region 116. In some embodiments, the bottom width RoI_BW, the height RoI_H, the width Patch_W, the height Patch_H, and dH(patchH−1) may be fixed. A parameter search may then be performed to determine the horizontal resolution ratio ratio_W and the vertical resolution ratio ratio_H. Fixing dH(patchH−1) may ensure that the resolution captured by the bottom of the multi-resolution image 308 remains fixed.

The parameter search may be performed by training a MLM 208 (e.g., according to the process 200) using training data and testing the trained MLM 208 (e.g., according to the process 200) using testing data while the multi-resolution patch generator 102 is configured to generate multi-resolution images 308 using particular parameters. This process may be repeated for different instances of the MLM 208 and for different values of the horizontal resolution ratio ratio_W and the vertical resolution ratio ratio_H. The trained candidate MLMs 208 may be evaluated to select the optimal or otherwise desired values for deployment. As a particular, and non-limiting example, for a multi-resolution image 308 that is 209 by 113, ratio_W=2 and ratio_H=8 may be a suitable parameter configuration. That is, the horizontal and vertical resolution corresponding to the top pixels of the multi-resolution images 308 may be 2× and 8× larger than those of a standard patch from the RoI 122, respectively. This may be achieved while only increasing computational load by 70%. In other examples, the parameters of the region 116 may be computed based on any of a variety of factors, such as camera properties, real-world distance measurements, and/or other factors.

Figure 4:
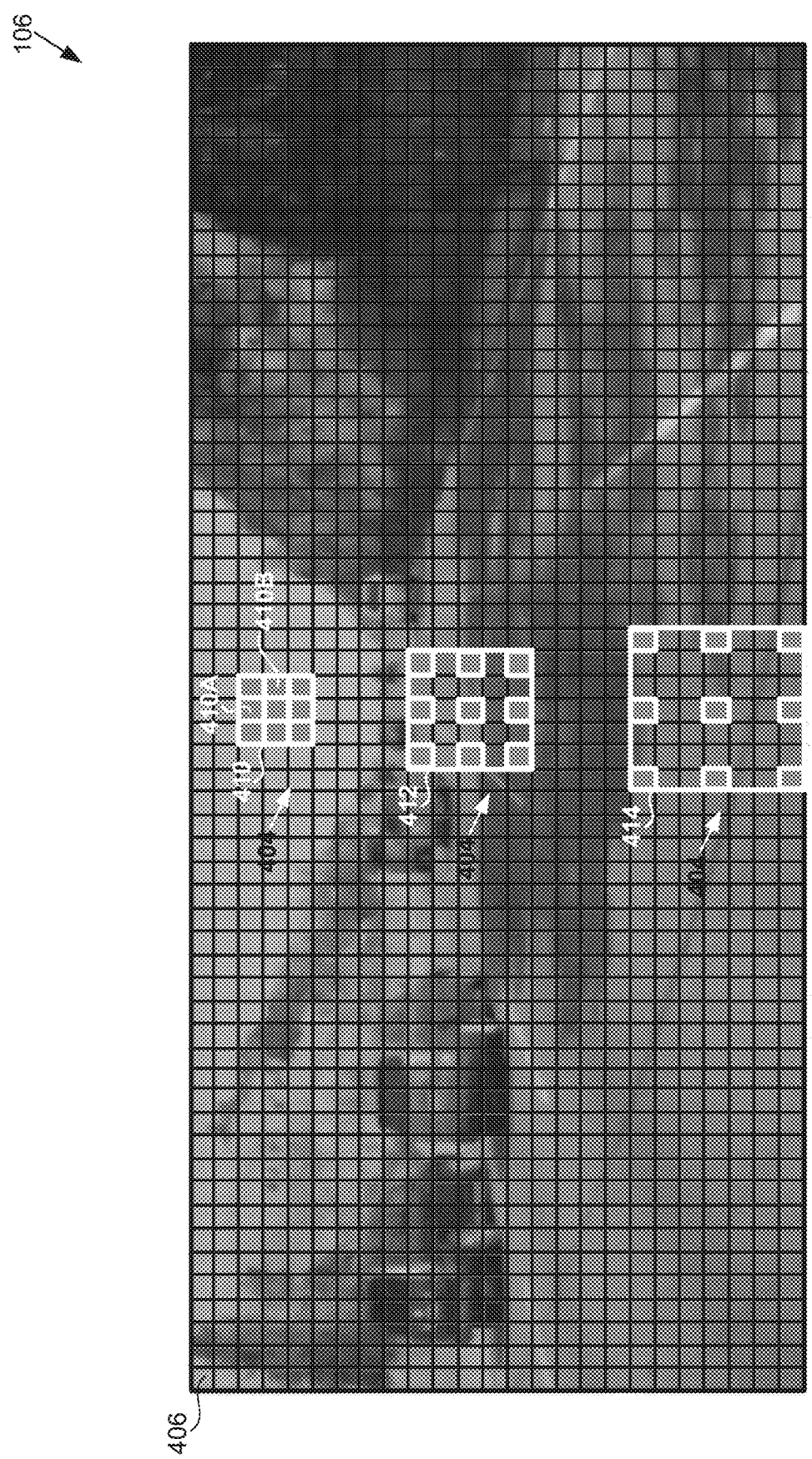
FIG. 4 is a diagram illustrating an example of adjusting dilation factors of a kernel of a convolutional layer to generate a multi-resolution patch, in accordance with some embodiments of the present disclosure.

While FIG. 3 is described in relation to the multi-resolution patch generator 102 generating the multi-resolution patch 108 as an image using a downsampling algorithm, as described herein, in some embodiments the multi-resolution patch generator 102 may generate the multi-resolution patch 108 as a feature map of a NN using one or more convolutional layers of the NN. Referring now to FIG. 4, FIG. 4 is a diagram illustrating an example of adjusting dilation factors of a kernel 404 of a convolutional layer to generate a multi-resolution patch, in accordance with some embodiments of the present disclosure.

FIG. 4 shows an image 406 which may correspond to the image 106 of FIG. 1 and FIG. 2B. A grid is overlaid on the image 406 with cells used to represent the pixels of the image 406, by way of example. As described herein, the downsampler 114 may downsample the region 116 (not shown in FIG. 4), at least partially, using one or more convolutional layers of the MLM(s) 208. For example, the source area determiner 112 may define the source areas based at least on adjusting dilation factors of one or more kernels (e.g., the kernel 404) of one or more convolutional layers of the MLM(s) 208 and the downsampler 114 may apply convolution to the source areas to downsample the region 116. A larger dilation factor may result in coverage of a larger field of view (corresponding to a lower resolution area being captured) while a smaller dilation factor may result in coverage of a smaller field of view (corresponding to a higher resolution area being captured).

FIG. 4 shows an example of the kernel 404 of a convolutional layer with the source areas 410, 412, and 414 that may be defined by the source area determiner 112 (the field of view covered by the convolution kernel). Emphasized cells within a source area indicate the locations within the source area that the downsampler 114 may apply convolution to according to the dilation factor(s). For example, the downsampler 114 may sample nine locations for each source area (for a 3×3 kernel 404, although other sizes may be used), which may include locations 410A and 410B for the source area 410. For the examples shown, the source area 410 may correspond to horizontal and vertical dilation factors of 1, the source area 412 may correspond to horizontal and vertical dilation factors of 2, and the source area 414 may correspond to horizontal and vertical dilation factors of 3, corresponding to source areas captured at high, middle, and low resolution relative to one another. The computation amounts for the source areas 410, 412, and 414 may be the same as the downsampler 114 processes the same number of locations per source area.

While the source areas are shown as having equal horizontal and vertical dilation factors, in some embodiments, the source area determiner 112 may use different horizontal and vertical dilation factors for one or more of the source areas. For example, one dilation factor (e.g., a horizontal dilation factor) may increase along a direction to capture lower resolution of the region 116 along that direction, and the other dilation factor may remain constant, or may vary at a different rate or in a different manner (e.g., a vertical dilation factor may increase at a slower rate along the direction). In some examples, the source area determiner 112 may use the same dilation factor(s) for each pixel of a same row of the image 406, or one or more dilation factors may vary within a row. In some examples, one or more dilation factors may be configured such that the horizontal and vertical resolutions (pixels per degree) of the region 116 captured by the resultant multi-resolution feature map linearly increases from near to far distance (e.g., from top to bottom). Similar to the example of FIG. 3, source areas may not be provided for locations that are outside of the region 116. Locations that are outside of the region 116 may still be processed if they fall inside a source region of another location, or the downsampler 114 may exclude or otherwise discount those locations.

The source area determiner 112 may define the source areas using any suitable approach. In some examples, equations may be used, similar to Equations (1)-(6), but adapted to control one or more dilation factors for the locations of the region 116 being sampled. In various embodiments, each location may be sampled, or the locations may be sparsely sampled. In some examples, stride may be set, configured, and/or adjusted to downsample to a feature map size. Additionally, in some embodiments, one or more other parameters(s) may be used in addition to or instead of dilation factors to control how source areas are defined and/or which locations within a source area are used for convolution, or to otherwise modify or control convolution.

In various embodiments, the first convolution layer of the convolutional stream(s) 220 or the combination of the first few convolutional layers (e.g., two or three convolutional layers) may be used to generate a multi-resolution feature map (having any number of channels). Examples of such convolutional layers are shown in FIG. 5, but FIG. 5 may also be generally applicable to embodiments that do not use a convolutional layer to generate a multi-resolution feature map.

Referring now to FIG. 5, FIG. 5 is a diagram illustrating an example of a neural network 508, in accordance with some embodiments of the present disclosure. In various embodiments, the MLM(s) 208 of FIGS. 2A and/or 2B may comprise the NN 508 of FIG. 5. The neural network 508 may include or be referred to as a convolutional neural network (CNN) and thus may alternatively be referred to herein as convolutional neural network 508, convolutional network 508, or CNN 508.

The CNN 508 may receive one or more inputs 502, which in various embodiments may include image data representing the image 106, the multi-resolution patch 108, the multi-resolution image 308, and/or sensor data from one or more sensor types. The input(s) 502 may be applied to one or more input layer(s) 544. In a non-limiting example, there may be three input layer(s) 544, and the layer(s) may receive YUV, RGB, JPEG, and/or other formats of image data at the input layer(s) 544. Without limitation, the input layer(s) 544 may have a spatial resolution of 66×200, or may have a smaller, or larger spatial resolution, depending on the embodiment.

The CNN 508 may include one or more normalization layers 546. The normalization layers may represent one or more normalization functions, such as batch normalization, local contrast normalization, simplified whitening layers, local response normalization, and/or another normalization function.

The CNN 508 may include a convolutional stream(s) 220 that includes a plurality of different layers, such as those described herein with respect to FIG. 2B. In a non-limiting example, the convolutional stream(s) 220 may include a plurality of convolutional layers that reduce the spatial resolution throughout the convolutional stream(s) 220. For example, and without limitation, as illustrated in FIG. 5, the convolutional layers may reduce the spatial resolution from 66×200, to 31×98, to 14×47, to 5×22, to 3×20, and to 1×18. To reduce the spatial resolution, filters or kernels of any of a number of sizes may be used, such as a 5×5 kernel, a 3×3 kernel, and so on. In order to reduce the spatial resolution to a final spatial resolution of the convolutional stream(s) 220 (e.g., 1×18, as illustrated in FIG. 5) there may be any number of convolutional layers. In addition, in order to reduce the spatial resolution from a first spatial resolution (e.g., 66×200) to a second spatial resolution (e.g., 31×98), one, three, twenty-four, thirty-six, forty-eight, sixty-four, and/or a different number of layers may be used within the convolutional stream(s) 220. As shown, in some embodiments, the kernel 404 described with respect to FIG. 4 may be implemented in the CNN 508.

The CNN 508 may include one or more fully connected layers 550. The fully connected layer(s) 550 may receive the output of the convolutional stream(s) 220, or there may be one or more layers between the output of the convolutional stream(s) 220 and the fully connected layer(s) 550, depending on the embodiment. The fully connected layer(s) 550 may also be referred to herein as the output layer(s) of the CNN 508, and may generate the output(s) 110. The final fully connected layer may include a number of neurons that corresponds to an output array.

Although the CNN 508 is described with respect to normalization layer(s) 546, convolutional layer(s), input layer(s) 544, and fully connected layer(s) 550, this is not intended to be limiting. Depending on the embodiment, the CNN 508 may include additional or alternative layer types, such as, but not limited to, those described herein (e.g., with respect to FIG. 2B). In addition, the size of the filters, the number of filters, the number of layers, the hyper-parameters, the functions, and/or other features and functionality of the CNN 508 may differ depending on the embodiment, without departing from the scope of the present disclosure.

In some embodiments, the source area determiner 112 may define the source areas using the same dimensions for each frame that is analyzed by the MLM patch processor(s) 104 of the MLM(s) 208. In such examples the MLM patch processor(s) 104 may be trained using source areas having those dimensions for each frame. In other examples, the dimensions of the source areas may vary for different frames, in which case the MLM patch processor(s) 104 may receive inputs indicative of the dimensions of the source areas, or may otherwise be capable of accounting for and/or identifying the variations to the source areas. For example, the MLM patch processor(s) 104 may be trained using the inputs so as to account for variations to the source areas.

In any embodiment, the source areas may be varied based at least on one or more characteristics of the vehicle 900 and/or other machine that is controlled using the output(s) 110 from the MLM(s) 208. For example, the MLM(s) 208 may be trained to learn the relationship between values of the one or more characteristics and the source areas, so that the source areas may be defined differently across frames while still being interpretable by the MLM(s). In some embodiments, data representative of the one or more characteristics may be used as or used to generate the input(s) indicative of the dimensions of the source areas.

The one or more characteristics may be based at least on, for example, vehicle speed, vehicle orientation, vehicle steering angle, vehicle proximity to one or more other objects, driving location (e.g., highway vs. surface street), etc. For example, the source areas may be adjusted so that resolutions captured by the downsampled versions of regions 116 are shifted higher for image portions nearer to the vehicle 900 based on increased vehicle speed and/or transitioning onto the highway. As a further example, the source areas may be curved based on vehicle steering angle and/or vehicle orientation to follow road curvature. These and other variations are contemplated as being within the scope of the present disclosure.

Figure 6:
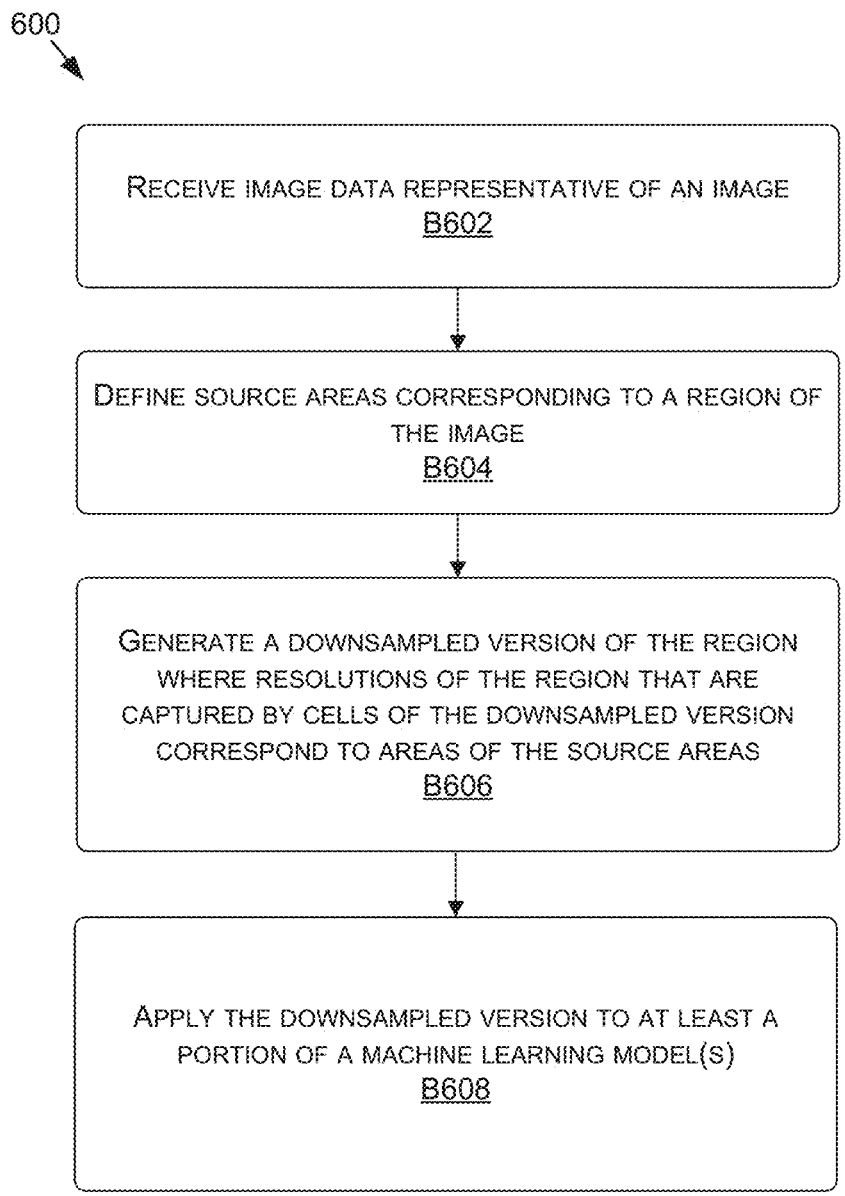
FIG. 6 is a flow diagram showing a method for generating a downsampled version of a region based on defining source areas that correspond to the region, in accordance with some embodiments of the present disclosure.

Now referring to FIG. 6, each block of method 600, and other methods described herein, comprises a computing process that may be performed using any combination of hardware, firmware, and/or software. For instance, various functions may be carried out by a processor executing instructions stored in memory. The method may also be embodied as computer-usable instructions stored on computer storage media. The method may be provided by a standalone application, a service or hosted service (standalone or in combination with another hosted service), or a plug-in to another product, to name a few. In addition, the method is described, by way of example, with respect to the system of FIG. 1. However, this method may additionally or alternatively be executed by any one system, or any combination of systems, including, but not limited to, those described herein.

FIG. 6 is a flow diagram showing a method 600 for generating a downsampled version of a region based on defining source areas that correspond to the region, in accordance with some embodiments of the present disclosure. The method 600, at block B602, includes receiving image data representative of an image. For example, the multi-resolution patch generator 102 may receive image data representative of the image 106. As described herein, the image 106 may be of a field of view of at least one sensor.

The method 600, at block B604, includes defining source areas corresponding to a region of the image. For example, the source area determiner 112 may define source areas that correspond to the region 116 of the image. As indicated in FIGS. 1, 3, and 4, areas of at least some of the source areas may decrease along at least one direction relative to a perspective of the at least one sensor.

The method 600, at block B606, includes generating a downsampled version of the region where resolutions of the region that are captured by cells of the downsampled version correspond to areas of the source areas. For example, the downsampler 114 may generate, from the source areas, data representative of the multi-resolution patch 108 based at least in part on mapping the source areas to cells of the multi-resolution patch 108. As described herein, resolutions of the region 116 that are captured by the cells of the multi-resolution patch 108 may correspond to the areas of the source areas.

The method 600, at block B608, includes applying the downsampled version to at least a portion of a machine learning model(s). For example, the multi-resolution patch 108 may be applied to at least the MLM patch processor(s) 104 of an MLM(s) 208 (e.g., in accordance with FIGS. 2A and/or 2B).

Figure 7:
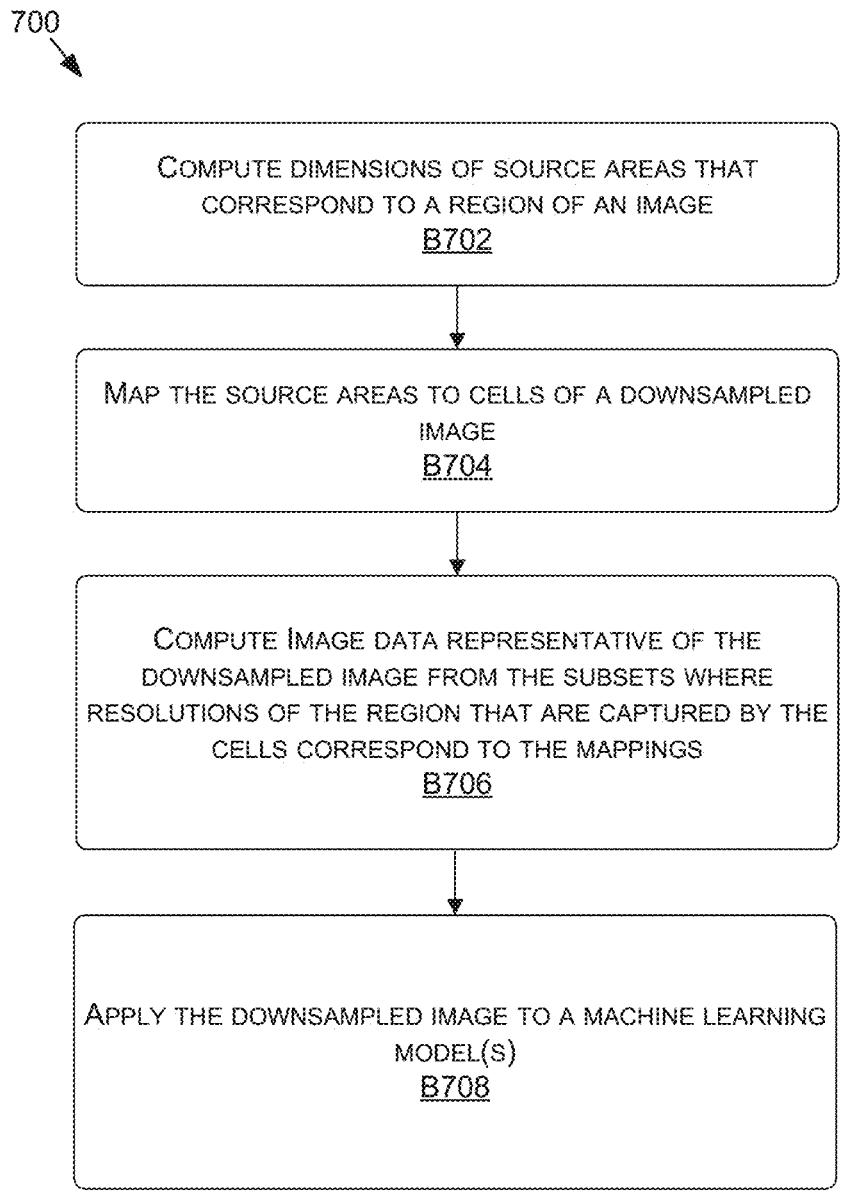
FIG. 7 is a flow diagram showing a method for generating a downsampled image of a region using a downsampling algorithm, in accordance with some embodiments of the present disclosure.

Referring now to FIG. 7, FIG. 7 is a flow diagram showing a method 700 for generating a downsampled image of a region using a downsampling algorithm, in accordance with some embodiments of the present disclosure. The method 700, at block B702, includes computing dimensions of source areas that correspond to a region of an image. For example, the source area determiner 112 may compute dimensions of source areas that correspond to the region 116 of the image 106. As described herein, and shown in FIG. 3, areas of at least some of the source areas may decrease along at least one direction relative to a boundary of the region 116. In some embodiments the dimensions may be computed using one or more of Equations (1)-(6) described herein.

The method 700, at block B704, includes mapping the source areas to cells of a downsampled image. For example, the downsampler 114 may map subsets of at least one source area of the source areas to cells (e.g., pixels) of the multi-resolution image 308, where a subset of the subsets is mapped with a cell of the cells. As described herein, any suitable downsampling algorithm may be used to define the mappings.

The method 700, at block B706, includes computing image data representative of the downsampled image from the subsets where resolutions of the region that are captured by the cells correspond to the mappings. For example, the downsampler 114 may compute image data representative of the multi-resolution image 308 from the subsets. For each cell, a resolution of the region 116 that is captured by the cell may correspond to an area of the at least one source area of the subset mapped with the cell.

The method 700, at block B708, includes applying the downsampled image to a machine learning model(s). For example, the multi-resolution image 308 may be applied to at least the MLM patch processor(s) 104 of an MLM(s) 208 (e.g., in accordance with FIG. 2A).

Figure 8:
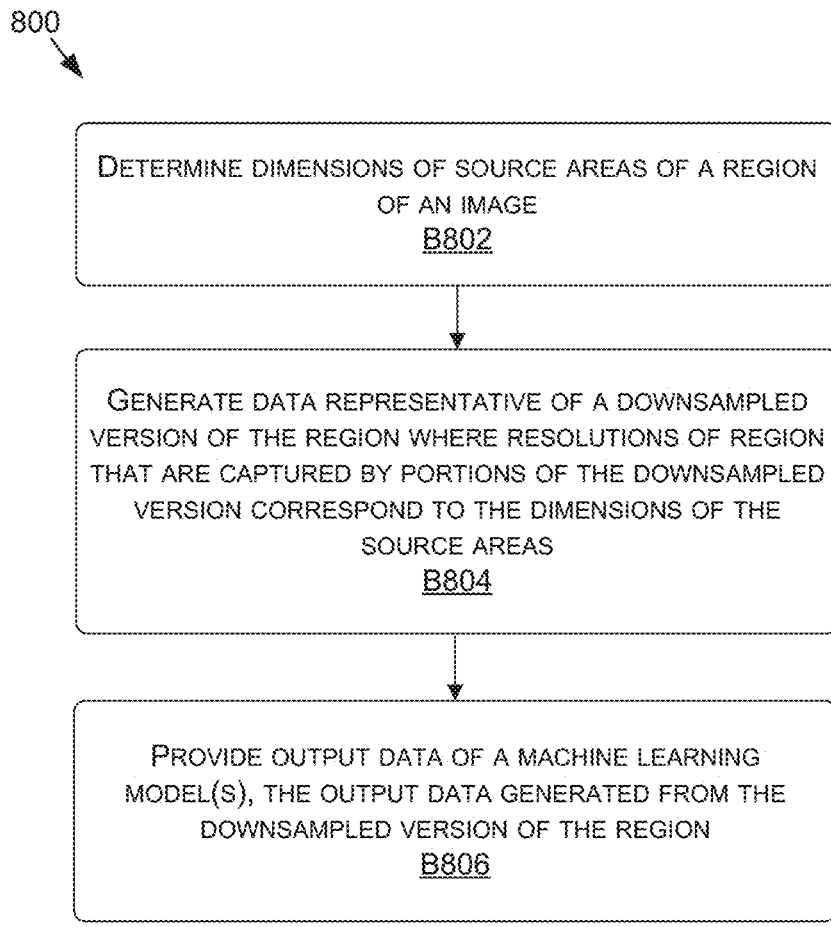
FIG. 8 is a flow diagram showing a method for generating a downsampled patch of a region based on determining dimensions of source areas, in accordance with some embodiments of the present disclosure.

Referring now to FIG. 8, FIG. 8 is a flow diagram showing a method 800 for generating a downsampled patch of a region based on determining dimensions of source areas, in accordance with some embodiments of the present disclosure. The method 800, at block B802, includes determining dimensions of source areas that correspond to a region of an image. For example, the source area determiner 112 may determine dimensions of source areas that correspond to the region 116 of the image 106 (or 406). As described herein, dimensions of at least some of the source areas may decrease along at least one direction relative to a boundary of the region 116.

The method 800, at block B804, includes generating data representative of a downsampled version of the region, where resolutions of the region that are captured by portions of the downsampled version of the region correspond to the dimensions of the source areas. For example, the downsampler 114 may generate the multi-resolution patch 108. Resolutions of the region 116 that are captured by portions of the multi-resolution patch 108 (e.g., pixels, features, etc.) may correspond to the dimensions of the source areas.

The method 800, at block B806, includes providing output data of one or more machine learning models, the output data generated using the downsampled version of the region. For example, the output(s) 110 may be provided to the control component(s) 218, as in FIG. 2A or 2B.

Example Autonomous Vehicle

Figure 9A:
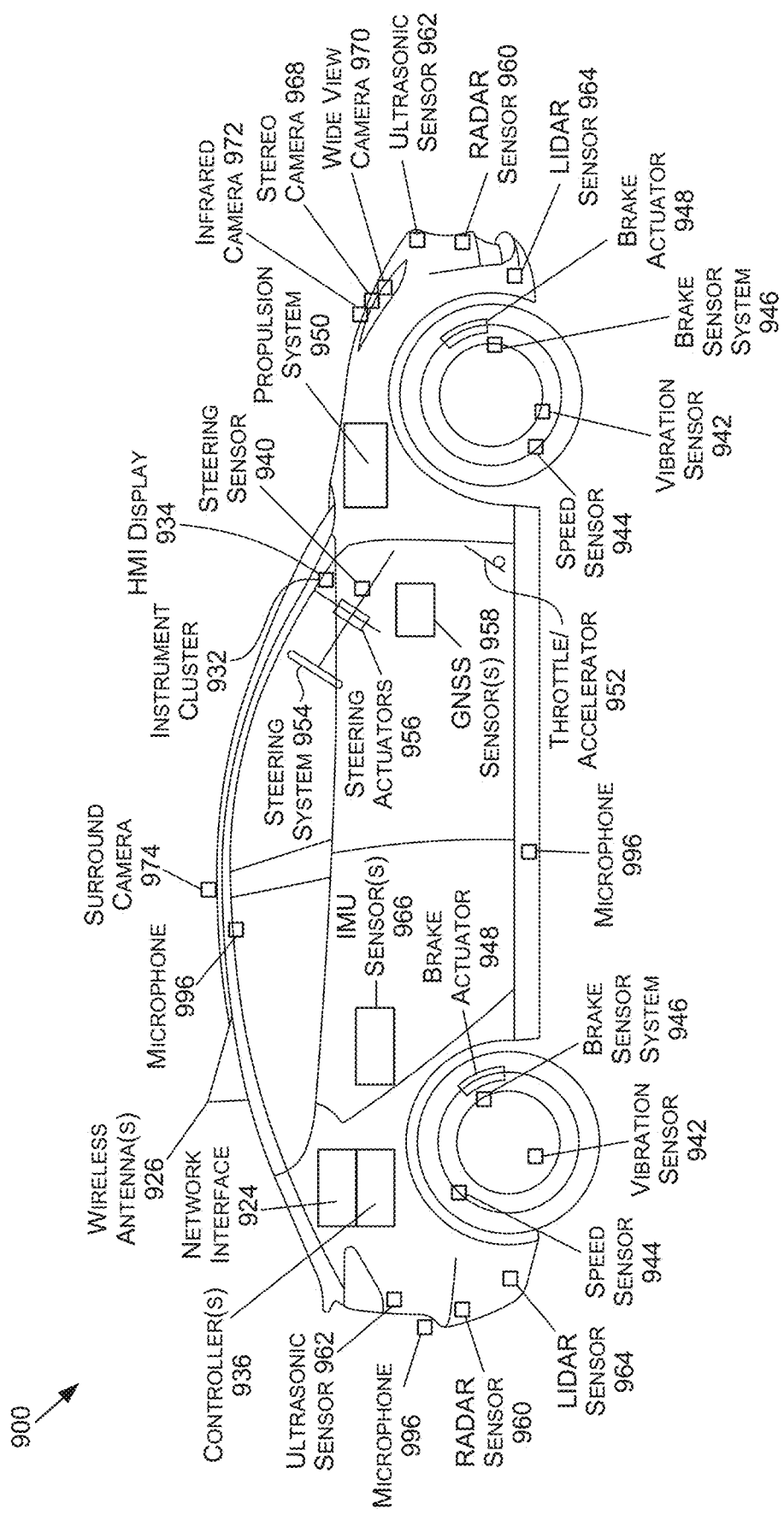
FIG. 9A is an illustration of an example autonomous vehicle, in accordance with some embodiments of the present disclosure.

FIG. 9A is an illustration of an example autonomous vehicle 900, in accordance with some embodiments of the present disclosure. The autonomous vehicle 900 (alternatively referred to herein as the "vehicle 900") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a drone, and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 900 may be capable of functionality in accordance with one or more of Level 3-Level 5 of the autonomous driving levels. For example, the vehicle 900 may be capable of conditional automation (Level 3), high automation (Level 4), and/or full automation (Level 5), depending on the embodiment.

The vehicle 900 may include components such as a chassis, a vehicle body, wheels (e.g., 2, 4, 6, 8, 18, etc.), tires, axles, and other components of a vehicle. The vehicle 900 may include a propulsion system 950, such as an internal combustion engine, hybrid electric power plant, an all-electric engine, and/or another propulsion system type. The propulsion system 950 may be connected to a drive train of the vehicle 900, which may include a transmission, to enable the propulsion of the vehicle 900. The propulsion system 950 may be controlled in response to receiving signals from the throttle/accelerator 952.

A steering system 954, which may include a steering wheel, may be used to steer the vehicle 900 (e.g., along a desired path or route) when the propulsion system 950 is operating (e.g., when the vehicle is in motion). The steering system 954 may receive signals from a steering actuator 956. The steering wheel may be optional for full automation (Level 5) functionality.

The brake sensor system 946 may be used to operate the vehicle brakes in response to receiving signals from the brake actuators 948 and/or brake sensors.

Controller(s) 936, which may include one or more system on chips (SoCs) 904 (FIG. 9C) and/or GPU(s), may provide signals (e.g., representative of commands) to one or more components and/or systems of the vehicle 900. For example, the controller(s) may send signals to operate the vehicle brakes via one or more brake actuators 948, to operate the steering system 954 via one or more steering actuators 956, to operate the propulsion system 950 via one or more throttle/accelerators 952. The controller(s) 936 may include one or more onboard (e.g., integrated) computing devices (e.g., supercomputers) that process sensor signals, and output operation commands (e.g., signals representing commands) to enable autonomous driving and/or to assist a human driver in driving the vehicle 900. The controller(s) 936 may include a first controller 936 for autonomous driving functions, a second controller 936 for functional safety functions, a third controller 936 for artificial intelligence functionality (e.g., computer vision), a fourth controller 936 for infotainment functionality, a fifth controller 936 for redundancy in emergency conditions, and/or other controllers. In some examples, a single controller 936 may handle two or more of the above functionalities, two or more controllers 936 may handle a single functionality, and/or any combination thereof.

The controller(s) 936 may provide the signals for controlling one or more components and/or systems of the vehicle 900 in response to sensor data received from one or more sensors (e.g., sensor inputs). The sensor data may be received from, for example and without limitation, global navigation satellite systems sensor(s) 958 (e.g., Global Positioning System sensor(s)), RADAR sensor(s) 960, ultrasonic sensor(s) 962, LIDAR sensor(s) 964, inertial measurement unit (IMU) sensor(s) 966 (e.g., accelerometer(s), gyroscope(s), magnetic compass(es), magnetometer(s), etc.), microphone(s) 996, stereo camera(s) 968, wide-view camera(s) 970 (e.g., fisheye cameras), infrared camera(s) 972, surround camera(s) 974 (e.g., 360 degree cameras), long-range and/or mid-range camera(s) 998, speed sensor(s) 944 (e.g., for measuring the speed of the vehicle 900), vibration sensor(s) 942, steering sensor(s) 940, brake sensor(s) (e.g., as part of the brake sensor system 946), and/or other sensor types.

One or more of the controller(s) 936 may receive inputs (e.g., represented by input data) from an instrument cluster 932 of the vehicle 900 and provide outputs (e.g., represented by output data, display data, etc.) via a human-machine interface (HMI) display 934, an audible annunciator, a loudspeaker, and/or via other components of the vehicle 900. The outputs may include information such as vehicle velocity, speed, time, map data (e.g., the HD map 922 of FIG. 9C), location data (e.g., the vehicle's 900 location, such as on a map), direction, location of other vehicles (e.g., an occupancy grid), information about objects and status of objects as perceived by the controller(s) 936, etc. For example, the HMI display 934 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 900 further includes a network interface 924 which may use one or more wireless antenna(s) 926 and/or modem(s) to communicate over one or more networks. For example, the network interface 924 may be capable of communication over LTE, WCDMA, UMTS, GSM, CDMA2000, etc. The wireless antenna(s) 926 may also enable communication between objects in the environment (e.g., vehicles, mobile devices, etc.), using local area network(s), such as Bluetooth, Bluetooth LE, Z-Wave, ZigBee, etc., and/or low power wide-area network(s) (LPWANs), such as LoRaWAN, SigFox, etc.

Figure 9B:
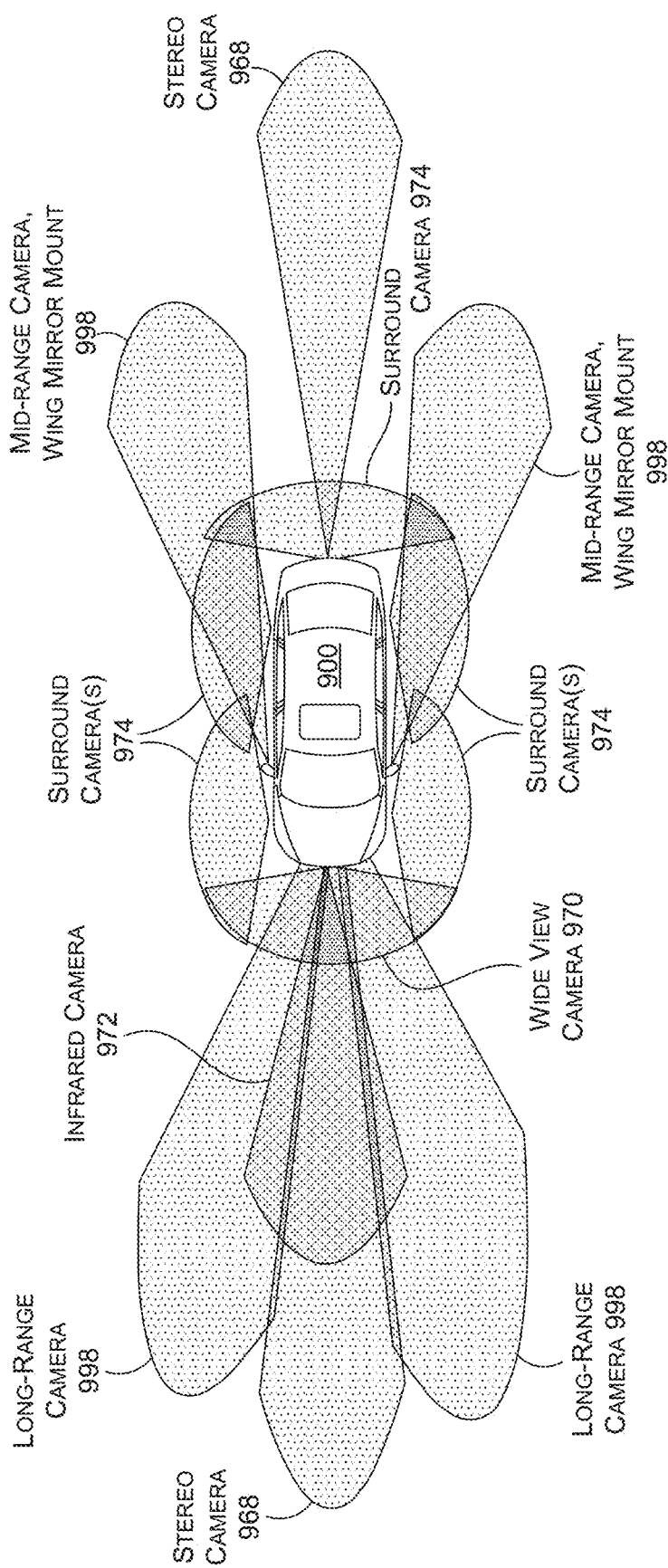
FIG. 9B is an example of camera locations and fields of view for the example autonomous vehicle of FIG. 9A, in accordance with some embodiments of the present disclosure.

FIG. 9B is an example of camera locations and fields of view for the example autonomous vehicle 900 of FIG. 9A, in accordance with some embodiments of the present disclosure. The cameras and respective fields of view are one example embodiment and are not intended to be limiting. For example, additional and/or alternative cameras may be included and/or the cameras may be located at different locations on the vehicle 900.

The camera types for the cameras may include, but are not limited to, digital cameras that may be adapted for use with the components and/or systems of the vehicle 900. The camera(s) may operate at automotive safety integrity level (ASIL) B and/or at another ASIL. The camera types may be capable of any image capture rate, such as 60 frames per second (fps), 920 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (3-D printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3-D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 900 (e.g., front-facing cameras) may be used for surround view, to help identify forward facing paths and obstacles, as well aid in, with the help of one or more controllers 936 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings ("LDW"), Autonomous Cruise Control ("ACC"), and/or other functions such as traffic sign recognition.

A variety of cameras may be used in a front-facing configuration, including, for example, a monocular camera platform that includes a CMOS (complementary metal oxide semiconductor) color imager. Another example may be a wide-view camera(s) 970 that may be used to perceive objects coming into view from the periphery (e.g., pedestrians, crossing traffic or bicycles). Although only one wide-view camera is illustrated in FIG. 9B, there may any number of wide-view cameras 970 on the vehicle 900. In addition, long-range camera(s) 998 (e.g., a long-view stereo camera pair) may be used for depth-based object detection, especially for objects for which a neural network has not yet been trained. The long-range camera(s) 998 may also be used for object detection and classification, as well as basic object tracking.

One or more stereo cameras 968 may also be included in a front-facing configuration. The stereo camera(s) 968 may include an integrated control unit comprising a scalable processing unit, which may provide a programmable logic (FPGA) and a multi-core micro-processor with an integrated CAN or Ethernet interface on a single chip. Such a unit may be used to generate a 3-D map of the vehicle's environment, including a distance estimate for all the points in the image. An alternative stereo camera(s) 968 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 968 may be used in addition to, or alternatively from, those described herein.

Cameras with a field of view that include portions of the environment to the side of the vehicle 900 (e.g., side-view cameras) may be used for surround view, providing information used to create and update the occupancy grid, as well as to generate side impact collision warnings. For example, surround camera(s) 974 (e.g., four surround cameras 974 as illustrated in FIG. 9B) may be positioned to on the vehicle 900. The surround camera(s) 974 may include wide-view camera(s) 970, fisheye camera(s), 360 degree camera(s), and/or the like. Four example, four fisheye cameras may be positioned on the vehicle's front, rear, and sides. In an alternative arrangement, the vehicle may use three surround camera(s) 974 (e.g., left, right, and rear), and may leverage one or more other camera(s) (e.g., a forward-facing camera) as a fourth surround view camera.

Cameras with a field of view that include portions of the environment to the rear of the vehicle 900 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 998, stereo camera(s) 968), infrared camera(s) 972, etc.), as described herein.

Figure 9C:
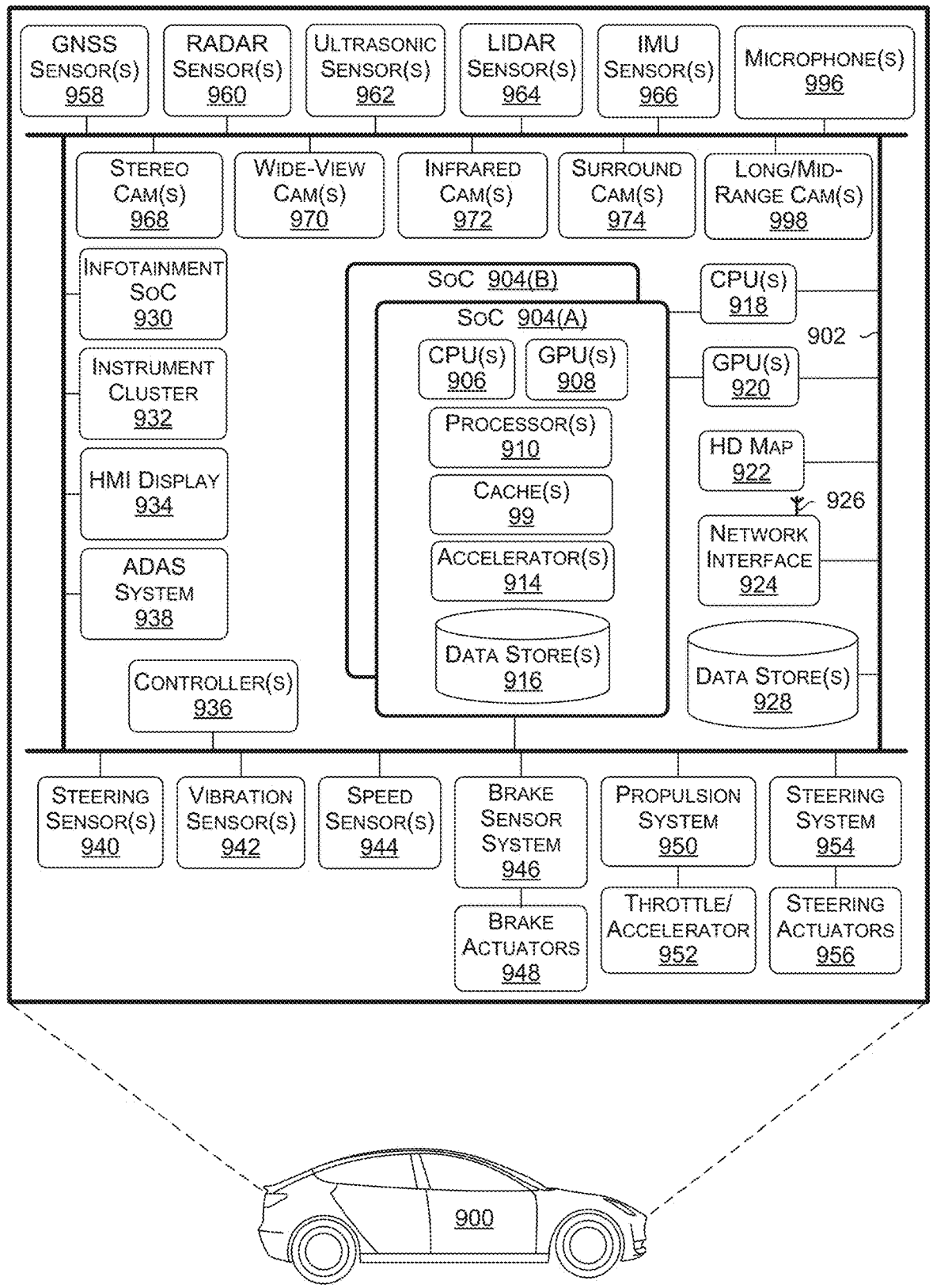
FIG. 9C is a block diagram of an example system architecture for the example autonomous vehicle of FIG. 9A, in accordance with some embodiments of the present disclosure.

FIG. 9C is a block diagram of an example system architecture for the example autonomous vehicle 900 of FIG. 9A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 900 in FIG. 9C are illustrated as being connected via bus 902. The bus 902 may include a Controller Area Network (CAN) data interface (alternatively referred to herein as a "CAN bus"). A CAN may be a network inside the vehicle 900 used to aid in control of various features and functionality of the vehicle 900, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 902 is described herein as being a CAN bus, this is not intended to be limiting. For example, in addition to, or alternatively from, the CAN bus, FlexRay and/or Ethernet may be used. Additionally, although a single line is used to represent the bus 902, this is not intended to be limiting. For example, there may be any number of busses 902, which may include one or more CAN busses, one or more FlexRay busses, one or more Ethernet busses, and/or one or more other types of busses using a different protocol. In some examples, two or more busses 902 may be used to perform different functions, and/or may be used for redundancy. For example, a first bus 902 may be used for collision avoidance functionality and a second bus 902 may be used for actuation control. In any example, each bus 902 may communicate with any of the components of the vehicle 900, and two or more busses 902 may communicate with the same components. In some examples, each SoC 904, each controller 936, and/or each computer within the vehicle may have access to the same input data (e.g., inputs from sensors of the vehicle 900), and may be connected to a common bus, such the CAN bus.

The vehicle 900 may include one or more controller(s) 936, such as those described herein with respect to FIG. 9A. The controller(s) 936 may be used for a variety of functions. The controller(s) 936 may be coupled to any of the various other components and systems of the vehicle 900, and may be used for control of the vehicle 900, artificial intelligence of the vehicle 900, infotainment for the vehicle 900, and/or the like.

The vehicle 900 may include a system(s) on a chip (SoC) 904. The SoC 904 may include CPU(s) 906, GPU(s) 908, processor(s) 910, cache(s) 912, accelerator(s) 914, data store(s) 916, and/or other components and features not illustrated. The SoC(s) 904 may be used to control the vehicle 900 in a variety of platforms and systems. For example, the SoC(s) 904 may be combined in a system (e.g., the system of the vehicle 900) with an HD map 922 which may obtain map refreshes and/or updates via a network interface 924 from one or more servers (e.g., server(s) 978 of FIG. 9D).

The CPU(s) 906 may include a CPU cluster or CPU complex (alternatively referred to herein as a "CCPLEX"). The CPU(s) 906 may include multiple cores and/or L2 caches. For example, in some embodiments, the CPU(s) 906 may include eight cores in a coherent multi-processor configuration. In some embodiments, the CPU(s) 906 may include four dual-core clusters where each cluster has a dedicated L2 cache (e.g., a 2 MB L2 cache). The CPU(s) 906 (e.g., the CCPLEX) may be configured to support simultaneous cluster operation enabling any combination of the clusters of the CPU(s) 906 to be active at any given time.

The CPU(s) 906 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 906 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 908 may include an integrated GPU (alternatively referred to herein as an "iGPU"). The GPU(s) 908 may be programmable and may be efficient for parallel workloads. The GPU(s) 908, in some examples, may use an enhanced tensor instruction set. The GPU(s) 908 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 908 may include at least eight streaming microprocessors. The GPU(s) 908 may use compute application programming interface(s) (API(s)). In addition, the GPU(s) 908 may use one or more parallel computing platforms and/or programming models (e.g., NVIDIA's CUDA).

The GPU(s) 908 may be power-optimized for best performance in automotive and embedded use cases. For example, the GPU(s) 908 may be fabricated on a Fin field-effect transistor (FinFET). However, this is not intended to be limiting and the GPU(s) 908 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 908 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 908 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 908 to access the CPU(s) 906 page tables directly. In such examples, when the GPU(s) 908 memory management unit (MMU) experiences a miss, an address translation request may be transmitted to the CPU(s) 906. In response, the CPU(s) 906 may look in its page tables for the virtual-to-physical mapping for the address and transmits the translation back to the GPU(s) 908. As such, unified memory technology may allow a single unified virtual address space for memory of both the CPU(s) 906 and the GPU(s) 908, thereby simplifying the GPU(s) 908 programming and porting of applications to the GPU(s) 908.

In addition, the GPU(s) 908 may include an access counter that may keep track of the frequency of access of the GPU(s) 908 to memory of other processors. The access counter may help ensure that memory pages are moved to the physical memory of the processor that is accessing the pages most frequently.

The SoC(s) 904 may include any number of cache(s) 912, including those described herein. For example, the cache(s) 912 may include an L3 cache that is available to both the CPU(s) 906 and the GPU(s) 908 (e.g., that is connected both the CPU(s) 906 and the GPU(s) 908). The cache(s) 912 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 904 may include an arithmetic logic unit(s) (ALU(s)) which may be leveraged in performing processing with respect to any of the variety of tasks or operations of the vehicle 900—such as processing DNNs. In addition, the SoC(s) 904 may include a floating point unit(s) (FPU(s))—or other math coprocessor or numeric coprocessor types—for performing mathematical operations within the system. For example, the SoC(s) 104 may include one or more FPUs integrated as execution units within a CPU(s) 906 and/or GPU(s) 908.

The SoC(s) 904 may include one or more accelerators 914 (e.g., hardware accelerators, software accelerators, or a combination thereof). For example, the SoC(s) 904 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 908 and to off-load some of the tasks of the GPU(s) 908 (e.g., to free up more cycles of the GPU(s) 908 for performing other tasks). As an example, the accelerator(s) 914 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 914 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 908, and by using an inference accelerator, for example, a designer may target either the DLA(s) or the GPU(s) 908 for any function. For example, the designer may focus processing of CNNs and floating point operations on the DLA(s) and leave other functions to the GPU(s) 908 and/or other accelerator(s) 914.

The accelerator(s) 914 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 906. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 914 (e.g., the hardware acceleration cluster) may include a computer vision network on-chip and SRAM, for providing a high-bandwidth, low latency SRAM for the accelerator(s) 914. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 904 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 914 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 966 output that correlates with the vehicle 900 orientation, distance, 3D location estimates of the object obtained from the neural network and/or other sensors (e.g., LIDAR sensor(s) 964 or RADAR sensor(s) 960), among others.

The SoC(s) 904 may include data store(s) 916 (e.g., memory). The data store(s) 916 may be on-chip memory of the SoC(s) 904, which may store neural networks to be executed on the GPU and/or the DLA. In some examples, the data store(s) 916 may be large enough in capacity to store multiple instances of neural networks for redundancy and safety. The data store(s) 912 may comprise L2 or L3 cache(s) 912. Reference to the data store(s) 916 may include reference to the memory associated with the PVA, DLA, and/or other accelerator(s) 914, as described herein.

The SoC(s) 904 may include one or more processor(s) 910 (e.g., embedded processors). The processor(s) 910 may include a boot and power management processor that may be a dedicated processor and subsystem to handle boot power and management functions and related security enforcement. The boot and power management processor may be a part of the SoC(s) 904 boot sequence and may provide runtime power management services. The boot power and management processor may provide clock and voltage programming, assistance in system low power state transitions, management of SoC(s) 904 thermals and temperature sensors, and/or management of the SoC(s) 904 power states. Each temperature sensor may be implemented as a ring-oscillator whose output frequency is proportional to temperature, and the SoC(s) 904 may use the ring-oscillators to detect temperatures of the CPU(s) 906, GPU(s) 908, and/or accelerator(s) 914. If temperatures are determined to exceed a threshold, the boot and power management processor may enter a temperature fault routine and put the SoC(s) 904 into a lower power state and/or put the vehicle 900 into a chauffeur to safe stop mode (e.g., bring the vehicle 900 to a safe stop).

The processor(s) 910 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 910 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 910 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 910 may further include a real-time camera engine that may include a dedicated processor subsystem for handling real-time camera management.

The processor(s) 910 may further include a high-dynamic range signal processor that may include an image signal processor that is a hardware engine that is part of the camera processing pipeline.

The processor(s) 910 may include a video image compositor that may be a processing block (e.g., implemented on a microprocessor) that implements video post-processing functions needed by a video playback application to produce the final image for the player window. The video image compositor may perform lens distortion correction on wide-view camera(s) 970, surround camera(s) 974, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 908 is not required to continuously render new surfaces. Even when the GPU(s) 908 is powered on and active doing 3D rendering, the video image compositor may be used to offload the GPU(s) 908 to improve performance and responsiveness.

The SoC(s) 904 may further include a mobile industry processor interface (MIPI) camera serial interface for receiving video and input from cameras, a high-speed interface, and/or a video input block that may be used for camera and related pixel input functions. The SoC(s) 904 may further include an input/output controller(s) that may be controlled by software and may be used for receiving I/O signals that are uncommitted to a specific role.

The SoC(s) 904 may further include a broad range of peripheral interfaces to enable communication with peripherals, audio codecs, power management, and/or other devices. The SoC(s) 904 may be used to process data from cameras (e.g., connected over Gigabit Multimedia Serial Link and Ethernet), sensors (e.g., LIDAR sensor(s) 964, RADAR sensor(s) 960, etc. that may be connected over Ethernet), data from bus 902 (e.g., speed of vehicle 900, steering wheel position, etc.), data from GNSS sensor(s) 958 (e.g., connected over Ethernet or CAN bus). The SoC(s) 904 may further include dedicated high-performance mass storage controllers that may include their own DMA engines, and that may be used to free the CPU(s) 906 from routine data management tasks.

The SoC(s) 904 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 904 may be faster, more reliable, and even more energy-efficient and space-efficient than conventional systems. For example, the accelerator(s) 914, when combined with the CPU(s) 906, the GPU(s) 908, and the data store(s) 916, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 920) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 908.

In some examples, a CNN for facial recognition and vehicle owner identification may use data from camera sensors to identify the presence of an authorized driver and/or owner of the vehicle 900. The always on sensor processing engine may be used to unlock the vehicle when the owner approaches the driver door and turn on the lights, and, in security mode, to disable the vehicle when the owner leaves the vehicle. In this way, the SoC(s) 904 provide for security against theft and/or carjacking.

In another example, a CNN for emergency vehicle detection and identification may use data from microphones 996 to detect and identify emergency vehicle sirens. In contrast to conventional systems, that use general classifiers to detect sirens and manually extract features, the SoC(s) 904 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 958. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 962, until the emergency vehicle(s) passes.

The vehicle may include a CPU(s) 918 (e.g., discrete CPU(s), or dCPU(s)), that may be coupled to the SoC(s) 904 via a high-speed interconnect (e.g., PCIe). The CPU(s) 918 may include an X86 processor, for example. The CPU(s) 918 may be used to perform any of a variety of functions, including arbitrating potentially inconsistent results between ADAS sensors and the SoC(s) 904, and/or monitoring the status and health of the controller(s) 936 and/or infotainment SoC 930, for example.

The vehicle 900 may include a GPU(s) 920 (e.g., discrete GPU(s), or dGPU(s)), that may be coupled to the SoC(s) 904 via a high-speed interconnect (e.g., NVIDIA's NVLINK). The GPU(s) 920 may provide additional artificial intelligence functionality, such as by executing redundant and/or different neural networks, and may be used to train and/or update neural networks based on input (e.g., sensor data) from sensors of the vehicle 900.

The vehicle 900 may further include the network interface 924 which may include one or more wireless antennas 926 (e.g., one or more wireless antennas for different communication protocols, such as a cellular antenna, a Bluetooth antenna, etc.). The network interface 924 may be used to enable wireless connectivity over the Internet with the cloud (e.g., with the server(s) 978 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 900 information about vehicles in proximity to the vehicle 900 (e.g., vehicles in front of, on the side of, and/or behind the vehicle 900). This functionality may be part of a cooperative adaptive cruise control functionality of the vehicle 900.

The network interface 924 may include a SoC that provides modulation and demodulation functionality and enables the controller(s) 936 to communicate over wireless networks. The network interface 924 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 900 may further include data store(s) 928 which may include off-chip (e.g., off the SoC(s) 904) storage. The data store(s) 928 may include one or more storage elements including RAM, SRAM, DRAM, VRAM, Flash, hard disks, and/or other components and/or devices that may store at least one bit of data.

The vehicle 900 may further include GNSS sensor(s) 958. The GNSS sensor(s) 958 (e.g., GPS, assisted GPS sensors, differential GPS (DGPS) sensors, etc.), to assist in mapping, perception, occupancy grid generation, and/or path planning functions. Any number of GNSS sensor(s) 958 may be used, including, for example and without limitation, a GPS using a USB connector with an Ethernet to Serial (RS-232) bridge.

The vehicle 900 may further include RADAR sensor(s) 960. The RADAR sensor(s) 960 may be used by the vehicle 900 for long-range vehicle detection, even in darkness and/or severe weather conditions. RADAR functional safety levels may be ASIL B. The RADAR sensor(s) 960 may use the CAN and/or the bus 902 (e.g., to transmit data generated by the RADAR sensor(s) 960) for control and to access object tracking data, with access to Ethernet to access raw data in some examples. A wide variety of RADAR sensor types may be used. For example, and without limitation, the RADAR sensor(s) 960 may be suitable for front, rear, and side RADAR use. In some example, Pulse Doppler RADAR sensor(s) are used.

The RADAR sensor(s) 960 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 960 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 900 surroundings at higher speeds with minimal interference from traffic in adjacent lanes. The other two antennae may expand the field of view, making it possible to quickly detect vehicles entering or leaving the vehicle's 900 lane.

Mid-range RADAR systems may include, as an example, a range of up to 960 m (front) or 80 m (rear), and a field of view of up to 42 degrees (front) or 950 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 900 may further include ultrasonic sensor(s) 962. The ultrasonic sensor(s) 962, which may be positioned at the front, back, and/or the sides of the vehicle 900, may be used for park assist and/or to create and update an occupancy grid. A wide variety of ultrasonic sensor(s) 962 may be used, and different ultrasonic sensor(s) 962 may be used for different ranges of detection (e.g., 2.5 m, 4 m). The ultrasonic sensor(s) 962 may operate at functional safety levels of ASIL B.

The vehicle 900 may include LIDAR sensor(s) 964. The LIDAR sensor(s) 964 may be used for object and pedestrian detection, emergency braking, collision avoidance, and/or other functions. The LIDAR sensor(s) 964 may be functional safety level ASIL B. In some examples, the vehicle 900 may include multiple LIDAR sensors 964 (e.g., two, four, six, etc.) that may use Ethernet (e.g., to provide data to a Gigabit Ethernet switch).

In some examples, the LIDAR sensor(s) 964 may be capable of providing a list of objects and their distances for a 360-degree field of view. Commercially available LIDAR sensor(s) 964 may have an advertised range of approximately 900 m, with an accuracy of 2 cm-3 cm, and with support for a 900 Mbps Ethernet connection, for example. In some examples, one or more non-protruding LIDAR sensors 964 may be used. In such examples, the LIDAR sensor(s) 964 may be implemented as a small device that may be embedded into the front, rear, sides, and/or corners of the vehicle 900. The LIDAR sensor(s) 964, in such examples, may provide up to a 920-degree horizontal and 35-degree vertical field-of-view, with a 200 m range even for low-reflectivity objects. Front-mounted LIDAR sensor(s) 964 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 900. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 964 may be less susceptible to motion blur, vibration, and/or shock.

The vehicle may further include IMU sensor(s) 966. The IMU sensor(s) 966 may be located at a center of the rear axle of the vehicle 900, in some examples. The IMU sensor(s) 966 may include, for example and without limitation, an accelerometer(s), a magnetometer(s), a gyroscope(s), a magnetic compass(es), and/or other sensor types. In some examples, such as in six-axis applications, the IMU sensor(s) 966 may include accelerometers and gyroscopes, while in nine-axis applications, the IMU sensor(s) 966 may include accelerometers, gyroscopes, and magnetometers.

In some embodiments, the IMU sensor(s) 966 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 966 may enable the vehicle 900 to estimate heading without requiring input from a magnetic sensor by directly observing and correlating the changes in velocity from GPS to the IMU sensor(s) 966. In some examples, the IMU sensor(s) 966 and the GNSS sensor(s) 958 may be combined in a single integrated unit.

The vehicle may include microphone(s) 996 placed in and/or around the vehicle 900. The microphone(s) 996 may be used for emergency vehicle detection and identification, among other things.

The vehicle may further include any number of camera types, including stereo camera(s) 968, wide-view camera(s) 970, infrared camera(s) 972, surround camera(s) 974, long-range and/or mid-range camera(s) 998, and/or other camera types. The cameras may be used to capture image data around an entire periphery of the vehicle 900. The types of cameras used depends on the embodiments and requirements for the vehicle 900, and any combination of camera types may be used to provide the necessary coverage around the vehicle 900. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 9A and FIG. 9B.

The vehicle 900 may further include vibration sensor(s) 942. The vibration sensor(s) 942 may measure vibrations of components of the vehicle, such as the axle(s). For example, changes in vibrations may indicate a change in road surfaces. In another example, when two or more vibration sensors 942 are used, the differences between the vibrations may be used to determine friction or slippage of the road surface (e.g., when the difference in vibration is between a power-driven axle and a freely rotating axle).

The vehicle 900 may include an ADAS system 938. The ADAS system 938 may include a SoC, in some examples. The ADAS system 938 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 960, LIDAR sensor(s) 964, and/or a camera(s). The ACC systems may include longitudinal ACC and/or lateral ACC. Longitudinal ACC monitors and controls the distance to the vehicle immediately ahead of the vehicle 900 and automatically adjust the vehicle speed to maintain a safe distance from vehicles ahead. Lateral ACC performs distance keeping, and advises the vehicle 900 to change lanes when necessary. Lateral ACC is related to other ADAS applications such as LCA and CWS.

CACC uses information from other vehicles that may be received via the network interface 924 and/or the wireless antenna(s) 926 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 900), while the I2V communication concept provides information about traffic further ahead. CACC systems may include either or both I2V and V2V information sources. Given the information of the vehicles ahead of the vehicle 900, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 960, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 960, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 900 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 900 if the vehicle 900 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 960, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 900 is backing up. Some RCTW systems include AEB to ensure that the vehicle brakes are applied to avoid a crash. RCTW systems may use one or more rear-facing RADAR sensor(s) 960, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 900, the vehicle 900 itself must, in the case of conflicting results, decide whether to heed the result from a primary computer or a secondary computer (e.g., a first controller 936 or a second controller 936). For example, in some embodiments, the ADAS system 938 may be a backup and/or secondary computer for providing perception information to a backup computer rationality module. The backup computer rationality monitor may run a redundant diverse software on hardware components to detect faults in perception and dynamic driving tasks. Outputs from the ADAS system 938 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 904.

In other examples, ADAS system 938 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 938 may be fed into the primary computer's perception block and/or the primary computer's dynamic driving task block. For example, if the ADAS system 938 indicates a forward crash warning due to an object immediately ahead, the perception block may use this information when identifying objects. In other examples, the secondary computer may have its own neural network which is trained and thus reduces the risk of false positives, as described herein.

The vehicle 900 may further include the infotainment SoC 930 (e.g., an in-vehicle infotainment system (IVI)). Although illustrated and described as a SoC, the infotainment system may not be a SoC, and may include two or more discrete components. The infotainment SoC 930 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 900. For example, the infotainment SoC 930 may radios, disk players, navigation systems, video players, USB and Bluetooth connectivity, carputers, in-car entertainment, Wi-Fi, steering wheel audio controls, hands free voice control, a heads-up display (HUD), an HMI display 934, a telematics device, a control panel (e.g., for controlling and/or interacting with various components, features, and/or systems), and/or other components. The infotainment SoC 930 may further be used to provide information (e.g., visual and/or audible) to a user(s) of the vehicle, such as information from the ADAS system 938, autonomous driving information such as planned vehicle maneuvers, trajectories, surrounding environment information (e.g., intersection information, vehicle information, road information, etc.), and/or other information.

The infotainment SoC 930 may include GPU functionality. The infotainment SoC 930 may communicate over the bus 902 (e.g., CAN bus, Ethernet, etc.) with other devices, systems, and/or components of the vehicle 900. In some examples, the infotainment SoC 930 may be coupled to a supervisory MCU such that the GPU of the infotainment system may perform some self-driving functions in the event that the primary controller(s) 936 (e.g., the primary and/or backup computers of the vehicle 900) fail. In such an example, the infotainment SoC 930 may put the vehicle 900 into a chauffeur to safe stop mode, as described herein.

The vehicle 900 may further include an instrument cluster 932 (e.g., a digital dash, an electronic instrument cluster, a digital instrument panel, etc.). The instrument cluster 932 may include a controller and/or supercomputer (e.g., a discrete controller or supercomputer). The instrument cluster 932 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 930 and the instrument cluster 932. In other words, the instrument cluster 932 may be included as part of the infotainment SoC 930, or vice versa.

Figure 9D:
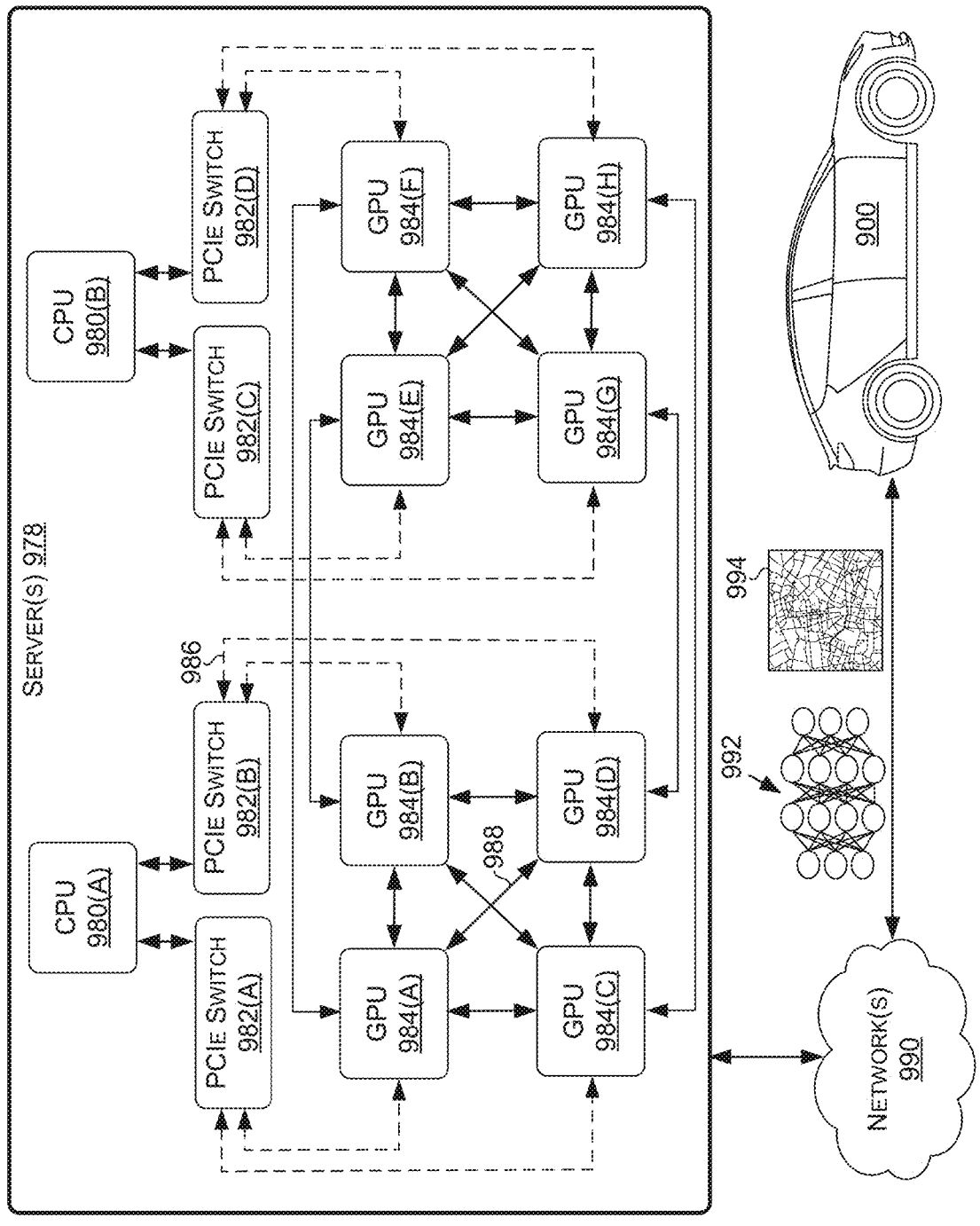
FIG. 9D is a system diagram for communication between cloud-based server(s) and the example autonomous vehicle of FIG. 9A, in accordance with some embodiments of the present disclosure.

FIG. 9D is a system diagram for communication between cloud-based server(s) and the example autonomous vehicle 900 of FIG. 9A, in accordance with some embodiments of the present disclosure. The system 976 may include server(s) 978, network(s) 990, and vehicles, including the vehicle 900. The server(s) 978 may include a plurality of GPUs 984(A)-984(H) (collectively referred to herein as GPUs 984), PCIe switches 982(A)-982(H) (collectively referred to herein as PCIe switches 982), and/or CPUs 980(A)-980(B) (collectively referred to herein as CPUs 980). The GPUs 984, the CPUs 980, and the PCIe switches may be interconnected with high-speed interconnects such as, for example and without limitation, NVLink interfaces 988 developed by NVIDIA and/or PCIe connections 986. In some examples, the GPUs 984 are connected via NVLink and/or NVSwitch SoC and the GPUs 984 and the PCIe switches 982 are connected via PCIe interconnects. Although eight GPUs 984, two CPUs 980, and two PCIe switches are illustrated, this is not intended to be limiting. Depending on the embodiment, each of the server(s) 978 may include any number of GPUs 984, CPUs 980, and/or PCIe switches. For example, the server(s) 978 may each include eight, sixteen, thirty-two, and/or more GPUs 984.

The server(s) 978 may receive, over the network(s) 990 and from the vehicles, image data representative of images showing unexpected or changed road conditions, such as recently commenced road-work. The server(s) 978 may transmit, over the network(s) 990 and to the vehicles, neural networks 992, updated neural networks 992, and/or map information 994, including information regarding traffic and road conditions. The updates to the map information 994 may include updates for the HD map 922, such as information regarding construction sites, potholes, detours, flooding, and/or other obstructions. In some examples, the neural networks 992, the updated neural networks 992, and/or the map information 994 may have resulted from new training and/or experiences represented in data received from any number of vehicles in the environment, and/or based on training performed at a datacenter (e.g., using the server(s) 978 and/or other servers).

The server(s) 978 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self-learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 990, and/or the machine learning models may be used by the server(s) 978 to remotely monitor the vehicles.

In some examples, the server(s) 978 may receive data from the vehicles and apply the data to up-to-date real-time neural networks for real-time intelligent inferencing. The server(s) 978 may include deep-learning supercomputers and/or dedicated AI computers powered by GPU(s) 984, such as a DGX and DGX Station machines developed by NVIDIA. However, in some examples, the server(s) 978 may include deep learning infrastructure that use only CPU-powered datacenters.

The deep-learning infrastructure of the server(s) 978 may be capable of fast, real-time inferencing, and may use that capability to evaluate and verify the health of the processors, software, and/or associated hardware in the vehicle 900. For example, the deep-learning infrastructure may receive periodic updates from the vehicle 900, such as a sequence of images and/or objects that the vehicle 900 has located in that sequence of images (e.g., via computer vision and/or other machine learning object classification techniques). The deep-learning infrastructure may run its own neural network to identify the objects and compare them with the objects identified by the vehicle 900 and, if the results do not match and the infrastructure concludes that the AI in the vehicle 900 is malfunctioning, the server(s) 978 may transmit a signal to the vehicle 900 instructing a fail-safe computer of the vehicle 900 to assume control, notify the passengers, and complete a safe parking maneuver.

For inferencing, the server(s) 978 may include the GPU(s) 984 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 10:
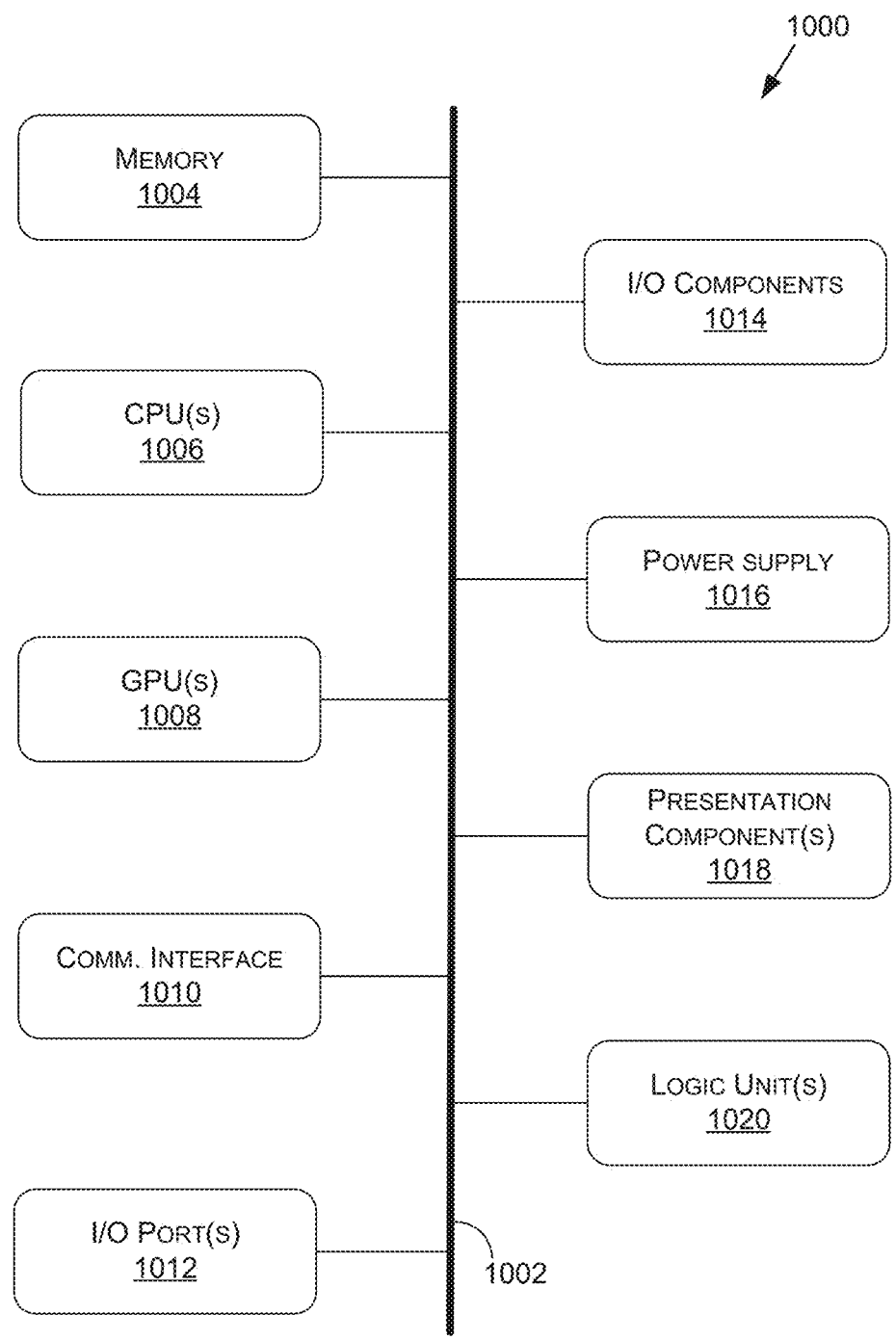
FIG. 10 is a block diagram of an example computing device suitable for use in implementing some embodiments of the present disclosure.

FIG. 10 is a block diagram of an example computing device(s) 1000 suitable for use in implementing some embodiments of the present disclosure. Computing device 1000 may include an interconnect system 1002 that directly or indirectly couples the following devices: memory 1004, one or more central processing units (CPUs) 1006, one or more graphics processing units (GPUs) 1008, a communication interface 1010, input/output (I/O) ports 1012, input/ output components 1014, a power supply 1016, one or more presentation components 1018 (e.g., display(s)), and one or more logic units 1020.

Although the various blocks of FIG. 10 are shown as connected via the interconnect system 1002 with lines, this is not intended to be limiting and is for clarity only. For example, in some embodiments, a presentation component 1018, such as a display device, may be considered an I/O component 1014 (e.g., if the display is a touch screen). As another example, the CPUs 1006 and/or GPUs 1008 may include memory (e.g., the memory 1004 may be representative of a storage device in addition to the memory of the GPUs 1008, the CPUs 1006, and/or other components). In other words, the computing device of FIG. 10 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 10.

The interconnect system 1002 may represent one or more links or busses, such as an address bus, a data bus, a control bus, or a combination thereof. The interconnect system 1002 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 1006 may be directly connected to the memory 1004. Further, the CPU 1006 may be directly connected to the GPU 1008. Where there is direct, or point-to-point connection between components, the interconnect system 1002 may include a PCIe link to carry out the connection. In these examples, a PCI bus need not be included in the computing device 1000.

The memory 1004 may include any of a variety of computer-readable media. The computer-readable media may be any available media that may be accessed by the computing device 1000. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 1004 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 1000. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 1006 may be configured to execute at least some of the computer-readable instructions to control one or more components of the computing device 1000 to perform one or more of the methods and/or processes described herein. The CPU(s) 1006 may each include one or more cores (e.g., one, two, four, eight, twenty-eight, seventy-two, etc.) that are capable of handling a multitude of software threads simultaneously. The CPU(s) 1006 may include any type of processor, and may include different types of processors depending on the type of computing device 1000 implemented (e.g., processors with fewer cores for mobile devices and processors with more cores for servers). For example, depending on the type of computing device 1000, the processor may be an Advanced RISC Machines (ARM) processor implemented using Reduced Instruction Set Computing (RISC) or an x86 processor implemented using Complex Instruction Set Computing (CISC). The computing device 1000 may include one or more CPUs 1006 in addition to one or more microprocessors or supplementary co-processors, such as math co-processors.

In addition to or alternatively from the CPU(s) 1006, the GPU(s) 1008 may be configured to execute at least some of the computer-readable instructions to control one or more components of the computing device 1000 to perform one or more of the methods and/or processes described herein. One or more of the GPU(s) 1008 may be an integrated GPU (e.g., with one or more of the CPU(s) 1006 and/or one or more of the GPU(s) 1008 may be a discrete GPU. In embodiments, one or more of the GPU(s) 1008 may be a coprocessor of one or more of the CPU(s) 1006. The GPU(s) 1008 may be used by the computing device 1000 to render graphics (e.g., 3D graphics) or perform general purpose computations. For example, the GPU(s) 1008 may be used for General-Purpose computing on GPUs (GPGPU). The GPU(s) 1008 may include hundreds or thousands of cores that are capable of handling hundreds or thousands of software threads simultaneously. The GPU(s) 1008 may generate pixel data for output images in response to rendering commands (e.g., rendering commands from the CPU(s) 1006 received via a host interface). The GPU(s) 1008 may include graphics memory, such as display memory, for storing pixel data or any other suitable data, such as GPGPU data. The display memory may be included as part of the memory 1004. The GPU(s) 1008 may include two or more GPUs operating in parallel (e.g., via a link). The link may directly connect the GPUs (e.g., using NVLINK) or may connect the GPUs through a switch (e.g., using NVSwitch). When combined together, each GPU 1008 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 1006 and/or the GPU(s) 1008, the logic unit(s) 1020 may be configured to execute at least some of the computer-readable instructions to control one or more components of the computing device 1000 to perform one or more of the methods and/or processes described herein. In embodiments, the CPU(s) 1006, the GPU(s) 1008, and/or the logic unit(s) 1020 may discretely or jointly perform any combination of the methods, processes and/or portions thereof. One or more of the logic units 1020 may be part of and/or integrated in one or more of the CPU(s) 1006 and/or the GPU(s) 1008 and/or one or more of the logic units 1020 may be discrete components or otherwise external to the CPU(s) 1006 and/or the GPU(s) 1008. In embodiments, one or more of the logic units 1020 may be a coprocessor of one or more of the CPU(s) 1006 and/or one or more of the GPU(s) 1008.

Examples of the logic unit(s) 1020 include one or more processing cores and/or components thereof, such as Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 1010 may include one or more receivers, transmitters, and/or transceivers that enable the computing device 1000 to communicate with other computing devices via an electronic communication network, included wired and/or wireless communications. The communication interface 1010 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The I/O ports 1012 may enable the computing device 1000 to be logically coupled to other devices including the I/O components 1014, the presentation component(s) 1018, and/or other components, some of which may be built in to (e.g., integrated in) the computing device 1000. Illustrative I/O components 1014 include a microphone, mouse, keyboard, joystick, game pad, game controller, satellite dish, scanner, printer, wireless device, etc. The I/O components 1014 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1000. The computing device 1000 may be include depth cameras, such as stereoscopic camera systems, infrared camera systems, RGB camera systems, touchscreen technology, and combinations of these, for gesture detection and recognition. Additionally, the computing device 1000 may include accelerometers or gyroscopes (e.g., as part of an inertia measurement unit (IMU)) that enable detection of motion. In some examples, the output of the accelerometers or gyroscopes may be used by the computing device 1000 to render immersive augmented reality or virtual reality.

The power supply 1016 may include a hard-wired power supply, a battery power supply, or a combination thereof. The power supply 1016 may provide power to the computing device 1000 to enable the components of the computing device 1000 to operate.

The presentation component(s) 1018 may include a display (e.g., a monitor, a touch screen, a television screen, a heads-up-display (HUD), other display types, or a combination thereof), speakers, and/or other presentation components. The presentation component(s) 1018 may receive data from other components (e.g., the GPU(s) 1008, the CPU(s) 1006, etc.), and output the data (e.g., as an image, video, sound, etc.).

Examples of Network Environments

Network environments suitable for use in implementing embodiments of the disclosure may include one or more client devices, servers, network attached storage (NAS) devices, other backend devices, and/or other device types. The client devices, servers, and/or other device types (e.g., each device) may be implemented on one or more instances of the computing device(s) 1000 of FIG. 10—e.g., each device may include similar components, features, and/or functionality of the computing device(s) 1000.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 1000 described herein with respect to FIG. 10. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A system comprising:
    one or more processing devices to perform operations comprising:
        determining a grid of source areas in a region of an image, wherein resolutions of the source areas decrease linearly along at least one direction relative to a location associated with a sensor used to generate the image;
        downsampling the grid of the source areas to generate a downsampled version of the grid, wherein, based at least on the resolutions of the source areas decreasing linearly, the downsampling comprises reducing the resolutions of a first subset of the source areas by a different amount than a second subset of the source areas; and
        providing output data of one or more machine learning models, generated using the downsampled version of the grid, to a control component of a machine.

2. The system of claim 1, wherein sizes defining the resolutions of the source areas decrease as a function of a width of the grid.

3. The system of claim 1, wherein dimensions of the grid are based at least on one or more dilation parameters of a kernel of a convolutional layer of the one or more machine learning models and the downsampled version of the grid is an output of the convolutional layer.

4. The system of claim 1, wherein the downsampling includes adjusting one or more dilation parameters of a kernel of a convolutional layer of a neural network.

5. The system of claim 1, wherein the determining the grid is based at least on one or more characteristics of the machine, and the one or more characteristics are provided as input to the one or more machine learning models, the one or more machine learning models being trained to learn relationships between values of the one or more characteristics and the source areas.

6. A processor comprising:
    one or more circuits to generate output data using one or more machine learning models and based at least on a downsampled version of a grid of source areas in a region of an image, the downsampled version of the grid generated based at least on:
    downsampling, based at least on mapping the source areas to target cells of the downsampled version of the grid, groups of pixels corresponding to the source areas of the grid such that the target cells of the downsampled version of the grid have a lower resolution than the source areas of the grid mapped to the target cells, wherein sizes corresponding to resolutions of the source areas linearly decrease as proximity increases between locations associated with the source areas and a location associated with a sensor used to generate the image.

7. The processor of claim 6, wherein the one or more machine learning models include a neural network and at least a portion of the grid is downsampled using one or more convolutional layers of the neural network to generate the downsampled version of the grid.

8. The processor of claim 6, wherein the grid is defined based at least on adjusting dilation factors of one or more kernels of one or more convolutional layers.

9. The processor of claim 6, wherein the grid has a trapezoidal shape and geometries of the source areas are defined along a direction based at least on a ratio between opposing sides of the trapezoidal shape.

10. The processor of claim 6, wherein the region is a region of interest identified within the image, the grid corresponds to a sub-region of the region, and dimensions of the sub-region are defined with respect to one or more dimensions of the region.

11. The processor of claim 10, wherein the downsampling includes, based at least on the mapping, at least one of:
   linearly interpolating one or more pixel values from the source areas to mapped one or more pixels of the target cells;
   bilinearly interpolating one or more pixel values from the source areas to mapped one or more pixels of the target cells; or
   cubically convolving one or more pixel values from the source areas to mapped one or more pixels of the target cells.

12. A method comprising:
   determining a grid of source areas in a region of an image, wherein resolutions of the source areas decrease linearly along at least one direction relative to a perspective associated with a sensor used to generate the image;
   downsampling the grid to generate a downsampled version of the grid, wherein, based at least on the resolutions of the source areas decreasing linearly, the downsampling comprises reducing one or more first resolutions of a first subset of the source areas by one or more first amounts and reducing one or more second resolutions of a second subset of the source areas by one or more second amounts; and
   providing output data of one or more machine learning models, generated using the downsampled version of the grid, to a control component of a machine.

13. The method of claim 12, wherein the resolutions of the source areas vary as a function of a width of the grid.

14. The method of claim 12, wherein for each target cell of the target cells, a single source area of the source areas is mapped to the target cell, the target cell represents a pixel of the downsampled version of the grid, and a portion of the image that represents the pixel is computed from image data that represents the single source area cell mapped with the target cell.

15. The method of claim 12, wherein the resolutions of the source areas decrease along a horizontal direction relative to a boundary of the region and along a vertical direction relative to the boundary of the region.

16. The system of claim 1, wherein the downsampling comprises determining, based at least on aggregating groups of pixels corresponding to the source areas into target cells associated with the downsampled version of the grid, pixel values for the target cells, wherein, based at least on the resolutions of the source areas decreasing linearly, one or more first pixel values for one of more first target cells are determined using less pixels than one or more second pixel values for one or more second target cells.

17. The method of claim 12, wherein the downsampling comprises aggregating pixels of the image corresponding to the source areas into target cells, wherein a first number of the pixels corresponding to a first source area is greater than a second number of the pixels corresponding to a second source area based at least on sizes of the source areas corresponding to the resolutions of the source areas decreasing linearly along the at least one direction.

18. The system of claim 1, wherein the grid of source areas includes at least:
   one or more first source areas corresponding to one or more first locations in an environment depicted in the image, the one or more first source areas having one or more first sizes defining one or more first resolutions of the resolutions,
   one or more second source areas corresponding to one or more second locations in the environment, the one or more second source areas having one or more second sizes defining one or more second resolutions of the resolutions, and
   the one or more first resolutions are greater than the one or more second resolutions based at least on the one or more first sizes being larger than the one or more second sizes.

19. The system of claim 1, wherein the grid of the source areas includes at least:
   one or more first source areas having one or more first geometries based at least on the one or more first source areas being positioned at one or more first locations within the grid, and
   one or more second source areas having one or more second geometries different from the one or more first geometries based at least on the one or more second source areas being positioned at one or more second locations within the grid.

20. The method of claim 12, wherein the downsampling comprises linearly reducing, based at least on the resolutions of the source areas decreasing linearly, the resolutions of the source areas such that the one or more first amounts by which the one or more first resolutions are reduced are different than the one or more second amounts by which the one or more second resolutions are reduced.

* * * * *